United States Patent
Kult et al.

(10) Patent No.: US 7,142,650 B1
(45) Date of Patent: Nov. 28, 2006

(54) SYSTEM AND METHOD FOR RESOURCE MANAGEMENT

(75) Inventors: George Kult, Fairfield, IA (US); Sharadha Vijay, Cedar Rapids, IA (US)

(73) Assignee: MCI Communication Corporation, Washington, DC (US)

( * ) Notice: Subject to any disclaimer, the term of this patent is extended or adjusted under 35 U.S.C. 154(b) by 0 days.

(21) Appl. No.: 09/096,939

(22) Filed: Jun. 12, 1998

(51) Int. Cl.
*H04M 15/00* (2006.01)

(52) U.S. Cl. .................................................. 379/112.01

(58) Field of Classification Search ............... 379/112, 379/113, 115, 130, 133, 134, 201, 220, 221, 379/265, 266, 309, 223, 111, 112.01, 112.06, 379/114.03, 127.02, 201.01, 201.03, 201.05, 379/201.12, 219, 221.03, 221.04, 221.06, 379/221.07
See application file for complete search history.

(56) References Cited

U.S. PATENT DOCUMENTS

| | | | |
|---|---|---|---|
| 4,928,304 A | 5/1990 | Sakai | |
| 5,541,917 A | 7/1996 | Farris | |
| 5,544,163 A | 8/1996 | Madonna | |
| 5,640,446 A | 6/1997 | Everett et al. | |
| 5,666,486 A | 9/1997 | Alfieri et al. | 709/217 |
| 5,673,299 A | 9/1997 | Fuller et al. | |
| 5,684,967 A * | 11/1997 | McKenna et al. | 715/853 |
| 5,706,437 A | 1/1998 | Kirchner et al. | |
| 5,790,173 A | 8/1998 | Strauss et al. | |
| 5,825,857 A * | 10/1998 | Reto et al. | 379/112 |
| 5,826,030 A | 10/1998 | Hebert | |
| 5,912,961 A * | 6/1999 | Taylor et al. | 379/201 |
| 5,920,621 A * | 7/1999 | Gottlieb | 379/112 |
| 5,937,042 A * | 8/1999 | Sofman | 379/112 |
| 1,802 A | 9/1999 | Ervin et al. | 379/243 |
| 6,058,181 A | 5/2000 | Hebert | |
| 6,076,114 A | 6/2000 | Wesley | 709/235 |
| 6,088,749 A | 7/2000 | Hebert et al. | |
| 6,097,727 A * | 8/2000 | Peters | 370/400 |
| 6,108,337 A | 8/2000 | Sherman et al. | |
| 6,119,187 A | 9/2000 | Hebert | |
| 1,897 A | 10/2000 | Fletcher et al | 455/433 |
| 6,134,618 A | 10/2000 | Hebert | 710/105 |
| 6,188,761 B1 | 2/2001 | Dickerman et al. | |
| 6,421,737 B1 | 7/2002 | Stone et al. | 719/318 |
| 6,510,164 B1 | 1/2003 | Ramaswamy et al. | 370/466 |
| 2001/0016038 A1 | 8/2001 | Sammon et al. | |
| 2001/0052006 A1 | 12/2001 | Barker et al. | |
| 2002/0120741 A1 | 8/2002 | Webb et al. | 709/225 |
| 2002/0152305 A1 | 10/2002 | Jackson et al. | 709/224 |
| 2002/0194251 A1 | 12/2002 | Richter et al. | 709/105 |
| 2003/0046396 A1 | 3/2003 | Richter et al. | 709/226 |

OTHER PUBLICATIONS

Newton, H., "Newton's Telecom Dictionary", Flatiron Publishing, Copyright Mar. 1998, 14$^{th}$ Edition, Page 370.

* cited by examiner

*Primary Examiner*—Binh K. Tieu

(57) ABSTRACT

A system and method of resource management is described. Within a telecommunications network, resources are sources of assistance in performing functions needed to process calls. The present invention is a system-wide approach to resource management that provides controlled access to information about resources. A resource management routine is described that comprises electronic libraries residing in memory of a computer system that store information about resources and resource management application programmer interfaces that are used to access the stored information.

17 Claims, 6 Drawing Sheets

SYSTEM AND METHOD FOR RESOURCE MANAGEMENT

BACKGROUND OF THE INVENTION

1. Field of the Invention

The present invention relates generally to managing resources in a telecommunications network or computer system environment.

2. Related Art

Telecommunications network products are services provided by telephone companies that are carried on telecommunications networks. A widely known example is dial-1 long distance voice service which allows a customer to dial a 1 plus a ten digit number from his or her home telephone, talk to a party who answers the telephone on the line of the ten digit number dialed, and pay for the telephone call when billed at the end of the month.

Although dial-1 is popular, other calling and payment options, also referred to as enhanced services, are sometimes preferable. For example, debit calling allows an individual to make a call from a phone other than their home phone and charge the call to the debit account. With debit calling, also referred to as prepaid calling, a customer puts finds in an account and has those funds debited each time a telephone call is made. Another calling and payment option is collect calling in which the call is billed to the receiving party's account.

Enhanced services are not limited to other calling and payment options. Enhanced services can provide a customer with information such as access to news and weather. Another enhanced service is 1-800-MUSICNOW which gives a telephone caller the ability to select and listen to music and then order a recording of the music by entering selections in response to menu prompts using the keypad of the telephone.

Enhanced services are possible because intelligent services networks (ISNs) within telephone companies telecommunications networks have advanced capabilities needed to process the enhanced service calls. The ISNs are networks that comprise ISN components capable of performing enhanced service call processing functions. Exemplary ISN components include computer systems that store data and perform protocol conversion and exchanges, also referred to as switches that route calls. In addition, for processing enhanced service calls, information about customers, calls, and telecommunications services is needed.

The information and ISN components are resources. Within a telecommunications network, resources are sources of assistance in performing functions needed to process calls.

For example, information such as the destination number dialed by a caller provides assistance in call processing by providing the area code which can be translated to determine what telecommunications network circuits should be used by ISN components to route the call to the intended recipient.

Information about resources may be obtained in multiple ways. For example, reports may be available that provide printed information about the resources. In addition, information may be available on-line by a human operator entering commands. Also, alarms may be generated that alert a human system overseer that a particular resource or group of resources is unavailable, malfunctioning, and/or in use more often than recommended. In typical ISNs, information is stored in an automated call distributor (ACD), an intelligent service network application processor (ISNAP), and other ISN components. The ACD provides the call switching, queuing, and protocol conversion functions. The intelligent service network applications processor (ISNAP) provides group selection functionality for the ISN.

Information about the resources is typically stored in electronic format in one or more computer systems. Application programmer interfaces (APIs) may be used to communicate call processing information and information about telecommunications components within a computer program. The APIs are procedures for communication within a computer program that reside in main memory and are processed by a processor. The APIs are used by programmable switches, such as the Excel programmable switch, to perform call processing functions. The API used by the Excel programmable switch is described in a document entitled, "Excel API specification revision 5.0." Additional APIs include the Tabman, Queman, Sysmem, and Shmman APIs that are described in more detail below.

Typically, information about resources is handled in a non-standard, de-centralized manner. Information about various components within a telecommunications network is accessible via the particular component. For example, central processing unit (CPU) availability of a switch is obtained from the switch. Information about the processing capability of computer systems that assist the switch is stored in memory of the computer systems. In addition, information is only accessible using commands or APIs that can be understood by the component storing the information. For example, to access information about the switch, commands that can be understood by the switch must be used to obtain the data about the switch that is stored within the switch. To access information about a computer system assisting the switch, commands understood by the assisting computer system must be used.

SUMMARY OF THE INVENTION

The present invention is a system and method for managing resources, more particularly ISN resources. Resource management is performed by a resource management routine within an application program that resides in the memory of a switch controller. The resource management routine manages internal switch controller resources and external resources such as programmable switches.

An ISN includes components which perform enhanced call handling functions, such as operator consoles and automated response units, and components that provide access to databases and other networks. Enhanced services, such as pre-paid service, calling card, operator service, 1-800-COLLECT, and 1-800-MUSIC-NOW are possible using the ISN. A switch controller is a telecommunications network component which controls the operation of one or more programmable switches and is capable of performing complex call processing to handle service specific features of enhanced telecommunications services. The switch controller provides an interface between the public switching telephone network (PSTN) and the intelligent service network (ISN).

The present invention is a system-wide approach to resource management. The resource management routine provides standard procedures used by processes to obtain information about resources. In addition, the resource management routine provides controlled access to information about resources. The resource management routine is essentially a protective layer for information about resources.

Compared to a library housing books which are resources for people to gain information, the resource management routine is a librarian which controls in a standardized way how resources are accessed by various different processes.

The resource management routine comprises electronic libraries residing in memory of the switch controller that store information about resources and resource management application programmer interfaces (APIs) that are used to access the stored information. Resource management APIs are stored in the main memory and processed by the processor of a computer. In order to process the resource management API, the processor calls the resource management API procedure from main memory. The resource management API procedure executes commands using input data. Completion of the execution of the resource management API results in return data which is the data requested and/or data indicating whether the transaction was successful and an output which is an action requested by the initiating routine.

Resource management APIs are generic in that they are not affected by changes to other APIs or messaging techniques, such as APIs for internal switch controller processing, the Excel programmable switch APIs, or changes to ISN protocols. Having a generic resource management API provides various benefits, including flexibility and extensibility. Flexibility is possible because the resource management APIs are independent of the other messaging techniques. Therefore, resource management does not need to be upgraded with changes to other routines and computer systems. In addition, if a new resource is added, the resource management routine needs to be updated but the new resource has a minimal impact on other routines and computer systems. As a result, changes can be more readily made to the ISN.

In addition, extensibility is improved with generic resource management APIs because new services can be more easily implemented. New services can be more easily implemented because modifications are not needed to the resource management routine unless implementation of the new service involves adding a new resource or modifying a resource such that access to data about that resource is affected. If a new resource is added or an existing resource is modified, changes are needed to the APIs associated with that resource and are not needed system wide.

Furthermore, maintenance and debugging of resource management routines within the switch controller are simplified and more accurate. Maintenance and debugging are simplified and more accurate because resource management APIs are standardized for the various resources. In other words, resource management APIs follow similar procedures when possible although the information is being accessed about different resources. As a result, resolution of maintenance and debugging issues for one resource management API is applicable to other resource management APIs. Also, resource management APIs are grouped within the same resource management routine. Therefore, maintenance and debugging resource management code involves accessing one routine and not attempting to identify resource management functionality within various processes and routines. Furthermore, individual routines are not required to have unique procedures and code for accessing information about resources. In addition to providing standard procedures, the generic resource management routine, which is available to routines requiring information about resources, reduces the overall code required to access resources.

Further features and advantages of the invention, as well as the structure and operation of various embodiments of the invention, are described in detail below with reference to the accompanying drawings.

BRIEF DESCRIPTION OF THE FIGURES AND TABLES

The present invention is described with reference to the accompanying drawings wherein.

In the drawings like reference numbers generally indicate identical functionally similar and/or structurally similar components. The drawing in which an element first appears is indicated by the left most digits in the corresponding reference number.

DETAILED DESCRIPTION OF THE PREFERRED EMBODIMENTS 1.0 Overview

Resource management within a switch controller provides management of intelligent service network (ISN) resources. A resource management routine within an application program residing in the memory of the switch controller manages resources by providing a protective layer of standard procedures, referred to as resource management application programmer interfaces (APIs) that are used to access information about ISN resources. The information about the ISN resources is stored electronically in memory and is organized in table format. The electronically stored data is referred to as the resource manager tables.

The ISN resources are resources associated with an ISN. An ISN is a network of components that perform functions to provide enhanced services, such as pre-paid service, calling card, operator service, 1-800-COLLECT, and 1-800-MUSIC-NOW. The ISN resources are sources of assistance in performing functions to provide enhanced services. The ISN components, such as operator consoles and automated response units, provide capabilities needed to process enhanced service calls and are ISN resources. In addition, information related to call processing is also an ISN resource.

The resource management routine resides within the memory of a switch controller. A switch controller is a telecommunications network component which provides an interface between the public switching telephone network (PSTN) and an intelligent service network (ISN). The switch controller provides control over ISN components, including one or more programmable switches, manual operator consoles, and automated response units (ARUs). In addition, the switch controller is capable of performing complex call processing to handle service specific features of enhanced telecommunications services.

The resource management routine comprises electronic libraries referred to as resource manager tables residing in memory of the switch controller that store information about resources and resource management application programmer interfaces (APIs) that are used to access the stored information. Resource management APIs are stored in the main memory and processed by the processor of a computer. In order to process the resource management API, the processor calls the resource management API procedure from main memory. The resource management API procedure executes commands using input data. The resource management API returns a response message that includes requested information and/or indication of whether the transaction was successful. The resource management API also results in an action requested by the initiating routine.

2.0 Example Resource Management Environment

Figure 1:
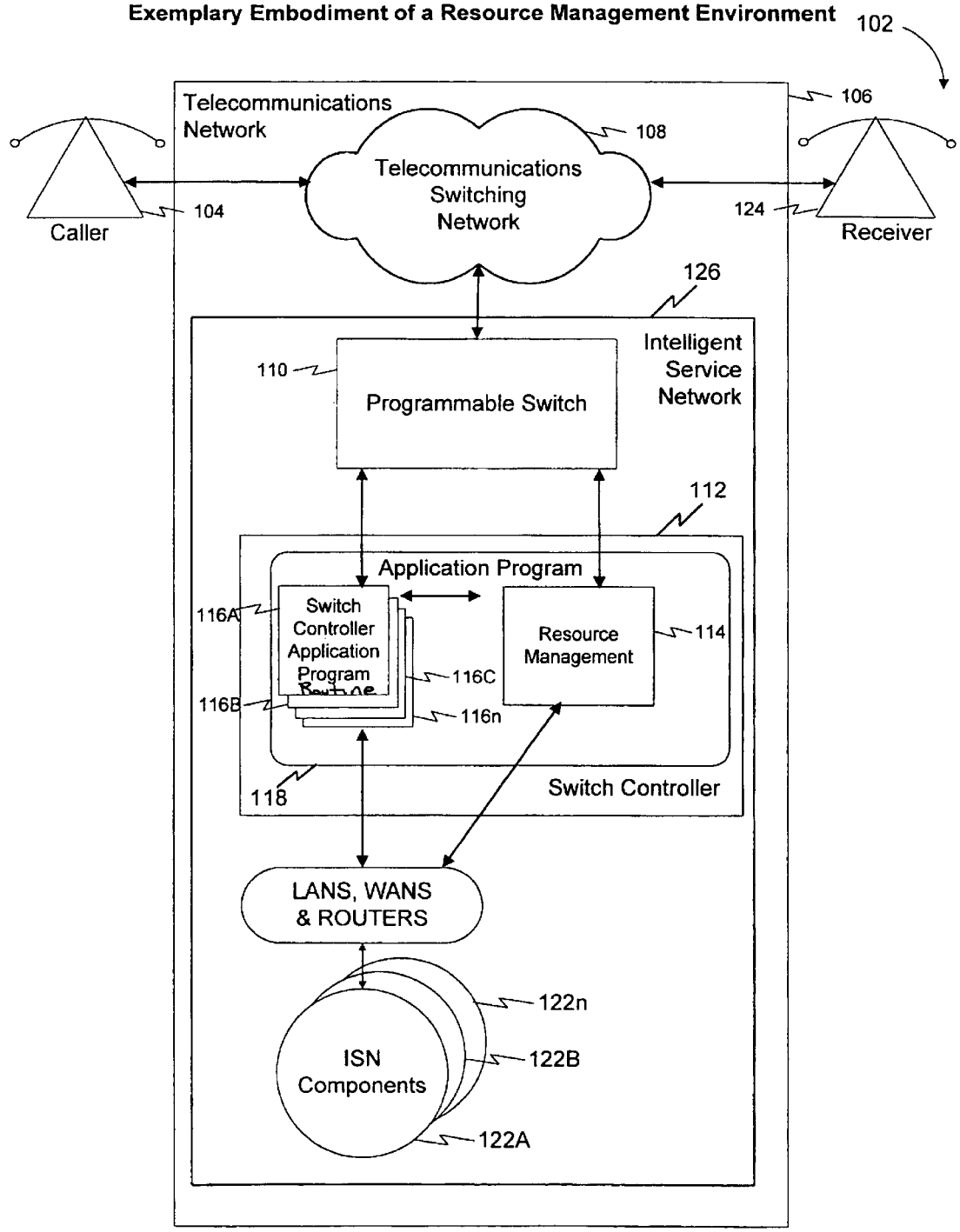
FIG. 1 is a block diagram of an exemplary embodiment of a resource management environment according to one embodiment of the present invention.

FIG. 1 is a block diagram of an exemplary embodiment of a resource management environment 102 according to one embodiment of the present invention. The switch controller 112 within the ISN 126 provides access for a call initiated via telecommunications switching network 108 to ISN components 122a, 122b, . . . 122n also within ISN 126. Except as otherwise noted, when the ISN components 122 are referred to generally, they will be referred to by number designation only and not a letter designation. The resource management routine which resides in memory of the switch controller 112 provides management of ISN 126 resources. The ISN 126 is described in further detail in copending U.S. Patent Application Ser. No. 09/096,936 entitled, "Intelligent Service Network," incorporated by reference herein in its entirety.

The ISN environment 102 includes telephone 104 used by a caller, a telecommunications switching network 108, and an ISN 126. The telephone 104 used by the caller is connected to telecommunications switching network 108. The telecommunications switching network 108 provides switching and connectivity to the ISN 126. The ISN components 122 provide enhanced service call processing and connectivity to external networks and resources. Enhanced services include manual operator service, prepaid calling, calling card, 1-800-COLLECT, and 1-800-MUSICNOW. External networks and resources include financial processors, information databases, and Internet facilities.

The ISN 126 includes a programmable switch 110, a switch controller 112, LANs, WANs, and routers 120, and ISN components 122. The programmable switch 110 is connected to the telecommunications switching network 108 to provide switching capabilities for access to the ISN 126. The switch controller 112 is interconnected to programmable switch 110 to provide commands to control the programmable switch 110. The LANs, WANs, and routers 120 are connected to switch controller 112 and the ISN components 122 to provide connectivity between the switch controller 112 and the ISN components 122. Exemplary ISN components 122 include manual operator consoles (MOCs), automated response units (ARUs), databases, and protocol converters. The MOCs and ARUs are personal computers (PCS) that interact with a caller to provide operator services, customer services, and other enhanced services. Databases contain stored information and may be a single database or multiple databases connected to and controlled by a server systems. Protocol converters are connected to external networks and resources and provide protocol conversion and other processing necessary for interface between the telecommunications switching network 108 and external networks and resources.

The exemplary embodiment of a resource management environment 102 can best be described referencing the processing of a typical call. The exemplary call will be for a service that requires human operator intervention. The call is placed by a caller using telephone 104. The call is received by telecommunications switching network 108. The telecommunications switching network 108 comprises multiple telecommunications networks including local exchange networks and interexchange networks. A local exchange network comprises switches and termination equipment within a localized area An example of a local exchange network is a local telephone operating company network, such as Bell Atlantic. An interexchange network comprises a plurality of switches, also referred to as exchanges, distributed throughout a geographic area large enough to process long distance telephone calls. For example, a national interexchange network comprises switches located throughout the nation. When the call is routed to either a local exchange network or an interexchange network, the call is routed to one or more switches within the network.

The telecommunications switching network 108 is interconnected to the programmable switch 110 within the ISN 126. The programmable switch 110 has a basic switching matrix that provides switching functionality for access to the ISN 126. An ISN 126 may include additional programmable switches (not shown) interconnected to switch controller 112 or to additional switch controllers (not shown). The programmable switch is a dumb switch that can connect ports and process calls based on external commands. Examples of programmable switches include those built by Excel and Summa Four. Excel programmable switches come in sizes ranging from 512 ports to 8,000 ports.

The ISN 126 has a sizable architecture because the number of programmable switches 110 and the configuration of the programmable switches 110 can vary depending on the desired port requirement of the ISN 126. Excel programmable switches can support various signaling systems such as Signaling System Number 7(SS7) and can be connected directly to the signaling network of a telecommunications switching network 108. If multiple programmable switches are interconnected to one or more switch controllers, connections between the programmable switches and the switch controllers are most likely via a LAN (not shown), such as an Ethernet LAN, using transmission control protocol/internet protocol (TCP/IP). Transmission control protocol/internet protocol is used by various data networks including many Internet servers. Each programmable switch 110 is connected to the telecommunications switching network 108 via voice telephony trunks, also referred to as lines. Typical telephony trunks are capable of carrying high speed digital data. The voice trunk connectivity between the programmable switch 110 and the telecommunications switching network 108 includes signaling, such as SS7 protocol. The current industry standard of SS7 protocol is published in the International Telecommunications Union (ITU) Signaling System Number 7(SS7) Integrated Services Digital Network (ISDN) User Part (ISUP) NCT1.113(1995) document and the International Telecommunications Union (ITU) Signaling System 7(SS7) Message Transfer Part (MTP) NCT 1.111(1992) document which are incorporated herein by reference in their entirety. Signaling System 7 may be implemented using SS7 signaling rings (not shown) connected to a signal transfer point (not shown). Some ISN 126 architectures may use signaling gateways between the signaling transfer point and the programmable switch although this is not necessary if the programmable switch is capable of the signaling used by the telecommunications switching network 108.

Switch controller 112 is connected to programmable switch 110 to provide external commands to control call processing. The switch controller 112 provides the commands to the programmable switch 110 to perform call processing functions. When the programmable switch 110 receives a call from the network it sends a message to the switch controller 112. The switch controller 112 determines the call processing needed and returns commands to the programmable switch 110.

In addition, the switch controller 112 provides access to ISN components 122. The switch controller interfaces with ISN components 122 via LANs. WANs, routers (or any other connectivity) 114 using Network Information Distribution System (NIDS) Sequenced Packet Protocol (NSPP) on top of User Datagram Protocol/Internet Protocol (UDP/IP). Network Information Distribution System Sequenced Packet Protocol is a session oriented packet exchange protocol that is implemented over UDP/IP. It is designed to allow rapid information exchange between client applications and NIDS server processes. The use of TCP/IP between switch controller 112 and the programmable switch 110 and the use of NSPP/UDP/IP for communications via LANs, WANs, routers (or any other connectivity) 114 illustrate exemplary protocols but the ISN 126 is not limited to these protocols.

Stored within memory of the switch controller 112 is the switch controller application program 118 which is the computer program that performs the functionality associated with switch controller 112. The switch controller application program 118 is processed by a processor. The architecture of the switch controller 112 will be described in further detail with respect to FIG. 2.

The resource management routine 114 resides in memory of the switch controller 112 within the switch controller application program 118. In one embodiment of the present invention, the resource management routine is within a resource control function. The resource control function is a process within the switch controller application program 118 that both provides management of resources and monitors resources. Resources are managed by the resource management routine 114. Monitoring is performed by a system control process, also within the resource control process. The system control process monitors call states and service related resources.

Switch controller application program routines 116A, 116B, 116C, . . . 116n reside in memory of the switch controller 112 within the switch controller application program 118 and, when executed, perform enhanced service call processing and other functions needed to provide an interface between the telecommunications switching network 108 and the ISN components 122. Except as otherwise noted, when the switch controller application program routines 116 are referred to generally, they will be referred to with the number designation only and not a letter designation. The routines within the switch controller application program 118 include the resource control function (described above), the programmable switch support function, the call control function, the service control function, and the management interface function.

The programmable switch support function provides an interface between the switch controller 112 and the programmable switch 110. The programmable switch support function translates messages between a generic switch controller API message format and programmable switch API message format, manages message header/trailer requirements, and controls connectivity to the programmable switch 110.

The call control function provides service independent call processing. The call control function performs call processing by analyzing call processing information with respect to the current state as defined by the basic call state machine model. Each call has two states represented in the state machine for the originating and terminating call segments. The basic call state machine model is described further in the International Telecommunications Union (ITU) specifications Q.1224. The call control function performs various functions including but not limited to: detecting an incoming call, creating an originating call model, collecting originating dial digits, requesting analysis of the digits, selecting trunk groups, creating a terminating call model, composing and sending messages to the terminating agent or party, detecting ISUP messages, detecting disconnect signals, and triggering enhanced services.

The call control function trigger features and services from the service control function. The service control function provides an interface to the ISN 126 and one or more service logic programs that provide enhanced service call processing. The service control function is made up of the switch service process, the group select process, call queuing process, and the prepaid service logic process. In order to provide an interface to the ISN 126, the switch service process connects between SCAPI used by the switch controller and NSPP used by ISN 126.

The management interface function includes two functional areas of monitoring control. The system monitoring functionality encompasses the generation of system alarms which allows a system management console to monitor the status and run-time operation of the switch controller software. The management interface function also includes the process manager, which is responsible for initial startup and health of individual processes which make up the switch controller 112.

The ISN components 122A, 122B, . . . 122n (122) include components that provide enhanced service functionality call and connectivity to external networks and resources. Except as otherwise noted, when the ISN components 122 are referred to generally, they will be referred to with the number designation only and not a letter designation. One example of an ISN component 122 is the MOC. The MOC is PC workstation that is operated by a live operator or call center agent to provide operator services, customer services, and other enhanced services requiring human operator intervention. Another example of an ISN component 122 is the ARU. The ARU is comprised of a network audio server (NAS) and an automated call processor (ACP). The ARU is used to provide automated operator services and interactive voice response services. The ACP is a high performance personal or midrange computer that performs intelligent application processing to determine which services to provide. The NAS is a specialized computer equipped with telephony ports which provides audio responses and collects caller input via dual tone multifrequency (DTMF) signals and voice recognition based on commands provided by the ACP. The ACPs communicate with the NASs via LANs, WANs, and routers 120. Each ARU/NAS and MOC is connected to one or more programmable switches via voice trunks (not shown). Both MOCs and ARUs are also referred to as agents.

An additional example of an ISN component 122 is a NIDS server and database. A NIDS server and database stores data related to call processing such as customer accounts and routing translations. When an ISN component, such as an ARU or a MOC, receives a call, it may query a NIDS server for data stored in the NIDS database. The NIDS servers receive data from mainframe-based systems to be used during real time call processing. Order entry and data management functions are performed within mainframe based systems. Mainframe computers are used as the databases of record for call processing data. A data distribution system (DDS) distributes the call processing data stored in the mainframe computers over a token ring LAN to each NIDS server.

The ISN components also include protocol converters that convert between various telecommunications protocols. Protocol converters provide protocol conversion between different protocols such as TCP/IP, NSPP on top of UDP/IP, and packet switching protocols, such as X.25. Exemplary components that perform protocol conversion are described in U.S. patent application Ser. No. 08/967,339 filed Oct. 21, 1997 entitled, "Advanced Intelligent Network Gateway" and U.S. patent application Ser. No. 08/956,220 filed Oct. 21, 1997 entitled, "Validation Gateway," both of which are incorporated herein by reference in their entirety. Additional ISN components 122 are described in copending U.S. patent application Ser. No. 08/956,232 filed Oct. 21, 1997 entitled, "A System and Method for Providing Operator and Customer Services for Intelligent Overlay Networks," incorporated herein by reference in its entirety.

Additional ISN components 122 include standalone PC workstations for system management, force management and configuration provisioning.

Some ISN components 122, such as protocol converters, are connected to external networks and resources. Exemplary external networks and resources include financial processors with credit card information, the Internet, and other databases, such as those used in processing international calls.

3.0 Resource Management within the Switch Controller

Figure 2:
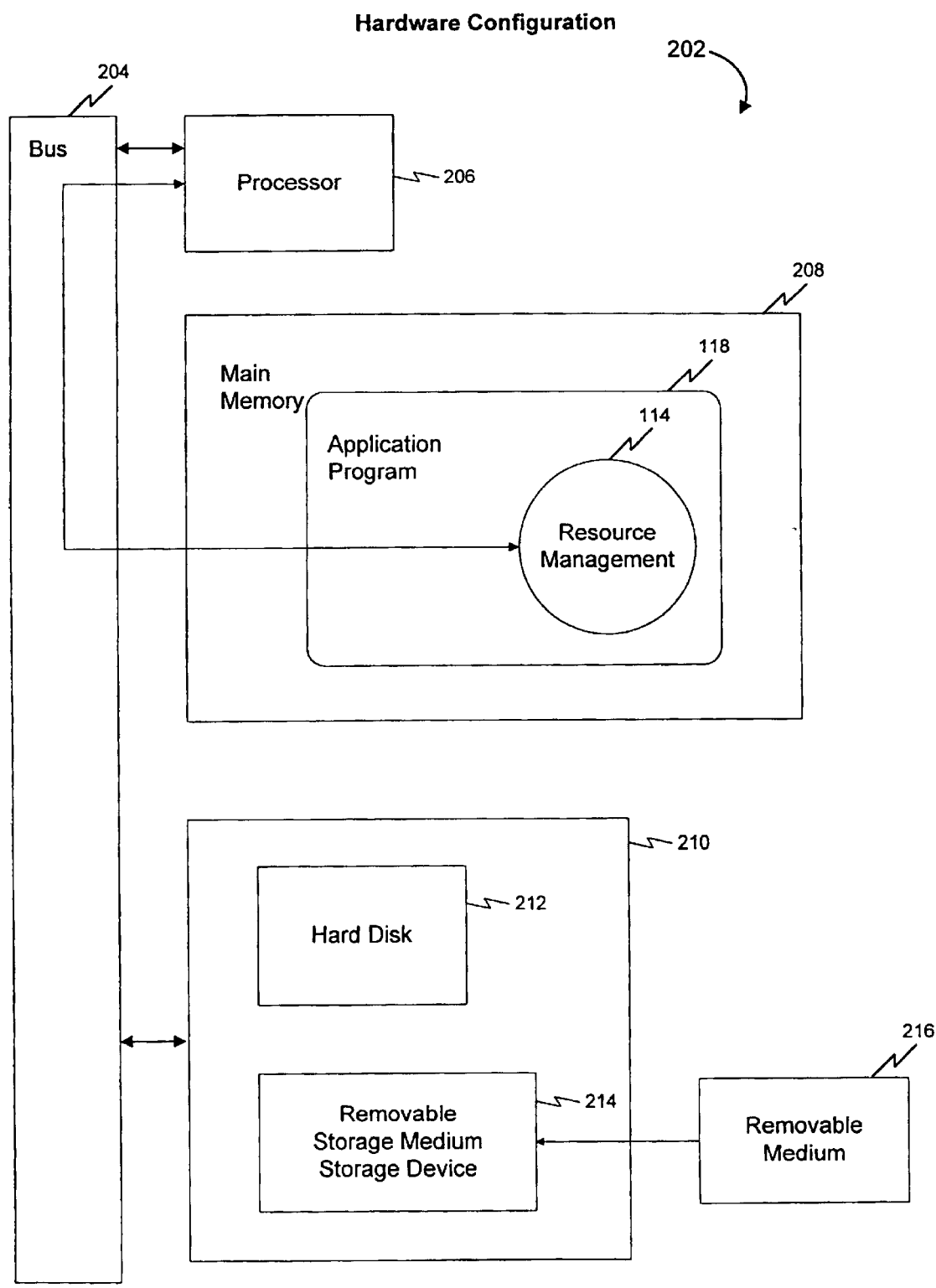
FIG. 2 is a block diagram of the hardware configuration of a switch controller according to one embodiment of the present invention.

The switch controller application program 118 of the present invention is preferably implemented using a computer system 202 as shown in block diagram form in FIG. 2. The computer system 202 includes one or more processors such as processor 206 connected to bus 204. Also connected to bus 204 is main memory 208 preferably random access memory (RAM) and secondary storage devices 210, secondary storage devices 210 include for example a hard drive 212 and a removable storage medium storage device 214 such as a disk drive.

The switch controller application program 118 is preferably a computer program that resides in main memory 208 while executing. Thus, the switch controller application program 118 represents the controller of the computer system 202 (and of the processor 206). Alternately, the switch controller application program 118 is predominantly or entirely a hardware device such as a hardware state machine.

In one embodiment, the present invention is a computer program product such as removable storage medium 216 representing a computer storage disk, compact disk etc., comprising a computer readable media having control logic recorded thereon. The control logic, when loaded into main memory 208 and executed by processor 206, enables the processor 206 to perform operations as described herein. The switch controller application program 118 includes commands which comprise the resource management routine 114 which, in one embodiment of the present invention, reside in main memory 208 and are processed by the processor 206.

Figure 3:
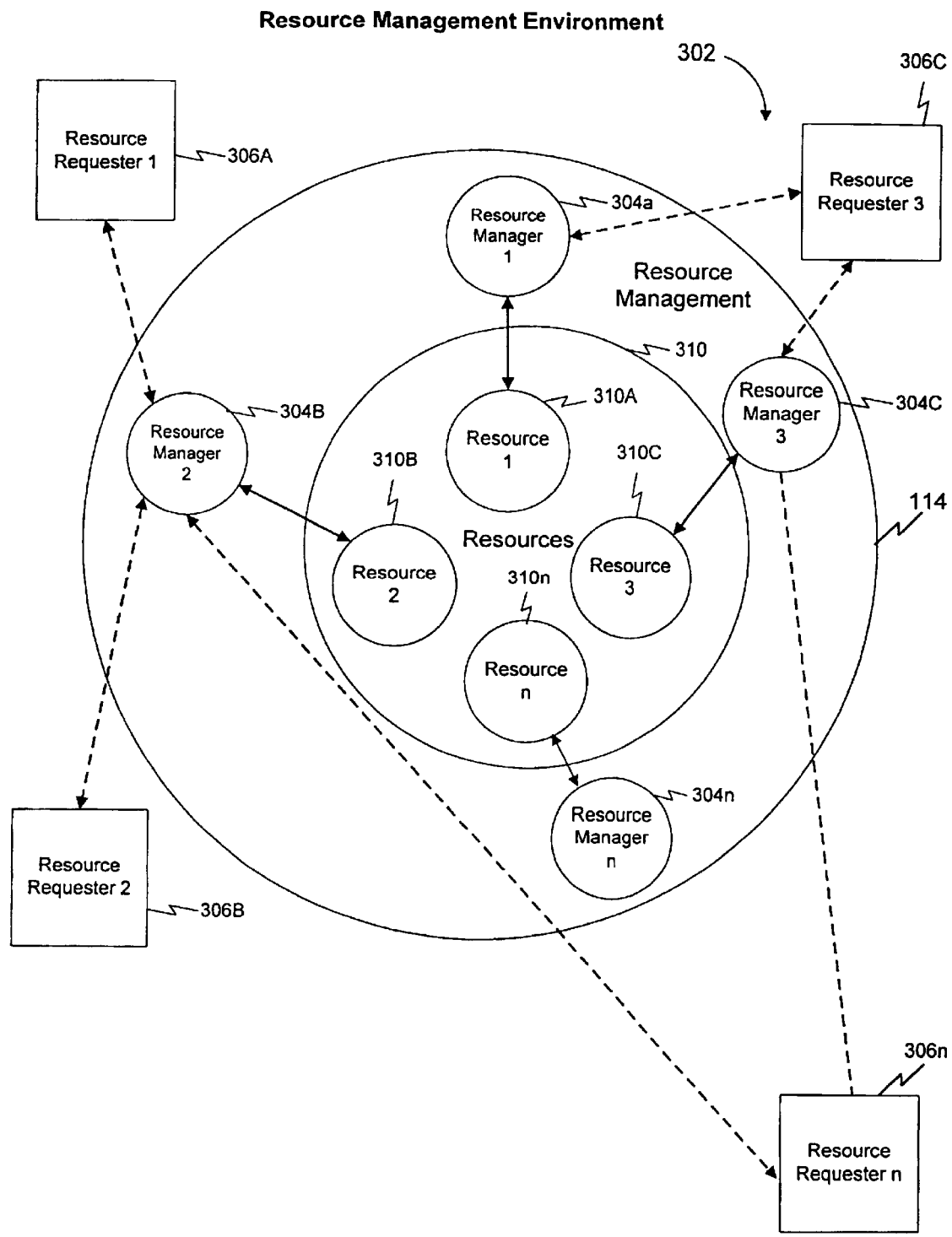
FIG. 3 is a flowchart of a resource management environment according to one embodiment of the present invention.

FIG. 3 is a block diagram of a resource management environment 302 according to one embodiment of the present invention. The block diagram of a resource management environment 302 illustrates the protective layer concept of the resource management routine 114. Within the resource management routine 114 are resource managers 304A, 304B, 304C . . . 304n (304). Resource requesters 306A, 306B, 306C . . . 306n (306) obtain information about resources 310A, 310B, 310C . . . 310n (310) by communicating with the resource managers 304. Thus, the resource managers 304 provide a protective layer for the resources 310. Except as otherwise noted, when the resource managers 304, resources 310, and resource requesters 306 are referred to generally, they will be referred to with the number designation only and not a letter designation.

The resource management routine 114 comprises the resource managers including resource manager (1) 304A, resource manager (2) 304B, resource manager (3) 304C, and resource manager n 304n.

Resources 310 include the equipment comprising the ISN 126 and enhanced service call processing information. Equipment comprising the ISN 126 includes the components comprising the programmable switch 110, components comprising the switch controller 112, and ISN components 122. Examples of components comprising the programmable switch 110 are ports, central processing unit (CPU) capacity, switch matrix, etc. Examples of components comprising the switch controller 112 are CPU capacity, shared memory capacity, etc. In addition, enhanced service call processing information is a resource 310. Enhanced service call processing information includes information about enhanced service calls, such as call identification numbers, leg identifiers, billing time points, etc.

Resource requesters 306 include the switch controller application program routines 116 (system control process, programmable switch support function, call control function, service control function, and management interface function). In addition, any routine in a computer program in a telecommunications network. component that can access the resource management routine 114 may be a resource requester 306.

Each resource manager 304 provides a protective interface for a particular corresponding resource 310. For example, resource manager (1) 304A provides a protective interface for resource (1) 310A. If a resource requester 306 wants information about a resource 310, the resource requester interfaces with the appropriate resource manager 304. For example, FIG. 3 illustrates resource requester (3) 306C requesting information from both resource manager (1) 304A to gain information about resource (1) 310A, and resource manager (3) 304C, to gain information about resource (3) 310C. If resource requester (3) is the service control function, the service control function may request information about agents and call data block information. The service control function would access a resource manager for information about the agents and another resource manager for information from the call data block.

Multiple resource requesters 306 may obtain information about a resource 310 by accessing the appropriate resource manager 304. For example, resource requester (1) 306A and resource requester (2) 306B request information from resource manager (2) 304B to gain information about resource (2) 310B. If the programmable switch support function and the management interface function need information about a component of the programmable switch 110, both routines access the resource manager 304 corresponding to the programmable switch component 110.

Figure 4:
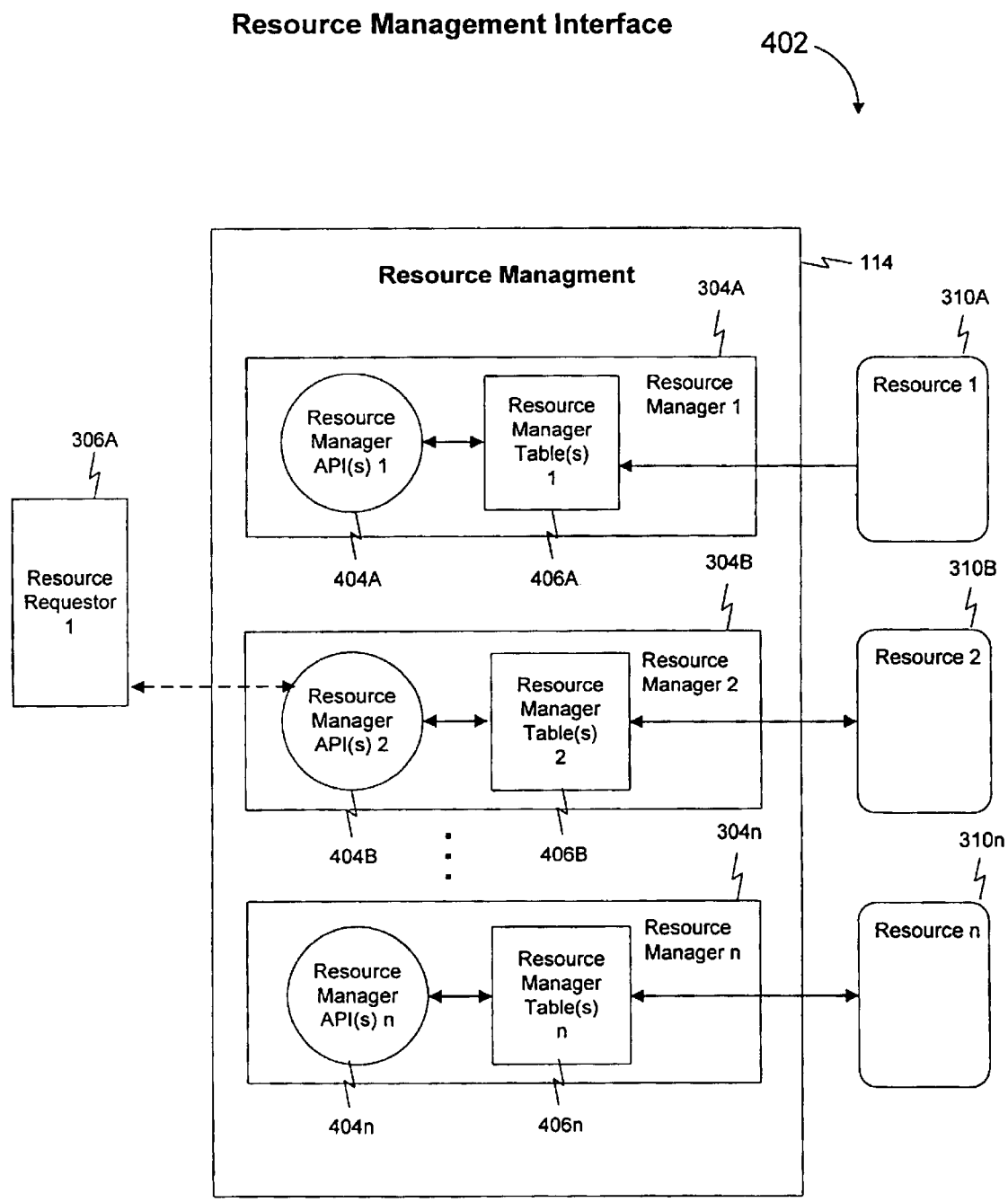
FIG. 4 is a block diagram of a resource management interface according to one embodiment of the present invention.

FIG. 4 is a block diagram of a resource management interface 402. The resource management routine 114 provides the resource management interface 402. The resource management interface 402 illustrates that in order to access information about a resource 310, a resource requester 306 accesses the appropriate resource manager 304. Exemplary resource requester (1) 306A accesses resource manager (2) 304B to obtain information about a corresponding resource (2) 310B. If exemplary resource requester (1) 306A needs information about resource (1) 310A or resource n 310n, the resource requester (1) 306A will access the corresponding resource manager 304, particularly resource manager (1) 304A or resource manager n 310n respectively. As a result, information about resources 310 is accessed in a standardized manner by each of the resource requesters 306. In addition, the resource requesters 306 are not required to have individual procedures for accessing information about resources 310. Rather, the resource requesters 306 use the generic procedures within the resource manager 304.

Each resource manager 304 includes one or more resource manager application programmer interfaces (APIs) 404 and one or more resource manager tables 406, referred to interchangeably as electronic libraries. For example, resource manager (1) 304A includes resource manager API(s) (1) 404A and resource manager table(s) (1) 406a; resource manager (2) 304B includes resource manager API(s) (2) 404B and resource manager table(s) (2) 406B; and resource manager n 304n includes resource manager API(s) n 404n and resource manager table(s) n 406n. Except as otherwise noted, when the resource manager APIs 404 and resource manager tables 406 are referred to generally, they will be referred to with the number designation only and not a letter designation.

The resource manager tables 406 reside in memory of the switch controller and store information about resources 310. The resource management APIs 404 are procedures that are used to access the stored information. Resource management APIs 404 are commands that are stored in the main memory and processed by the processor of a computer. In order to process a resource management API 404, the processor calls the resource management API 404 from main memory. The resource management API 404 processes by executing commands using input data. Completion of the execution of the resource management API 404 results in return data which is the data requested and/or data indicating whether the transaction was successful and an output which is an action requested by the initiating routine.

Figure 5:
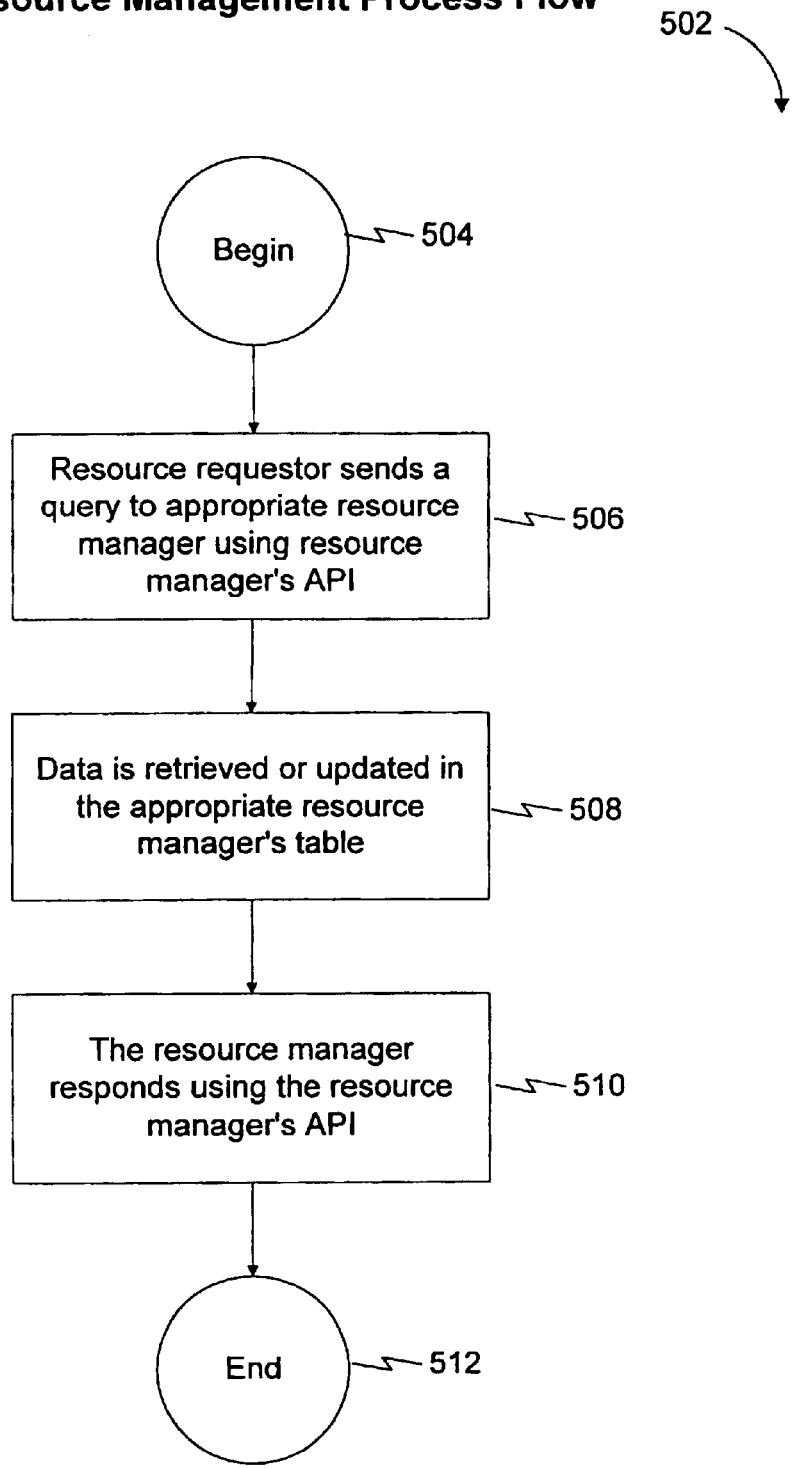
FIG. 5 illustrates the operation of a resource management process flow according to one embodiment of the present invention.

FIG. 5 illustrates the operation of resource manager process flow 502. In step 506 the resource requester sends a query to the appropriate resource manager 304 using the resource manager API 404. For example, as shown in FIG. 4 resource requester (1) 306A would send a query using the resource manager API (2) 404B to resource manager (2) 304B to access information in resource manager tables (2) 406B. The switch controller uses UNIX interprocess communications (IPC) capabilities in order to facilitate communication among the routines of the switch controller. Particularly, UNIX IPC queues and shared memory capabilities are used.

Switch controller application program routines 116 send queries to well known IPC queues. The queries contain a reference pointer to shared memory. The shared memory is dynamically allocated and contains data needed to perform the resource manager API 404 request. The processor 206 (shown in FIG. 2) executes the resource manager API 404 commands residing in memory which preferably is main memory 208 but may be secondary memory 210 including hard disk 212 or a removable medium 216. In the example above, the processor executing the resource manager (2) API 404B commands generates a query which is sent from the resource requester (1) 306A (shown in FIG. 4 and FIG. 3) to a queue associated with resource manager (2) 304B. The queue includes a reference pointer to shared memory with data needed to retrieve information about the resource 310.

For example, if the resource requester 306 is the call control function, an exemplary communication is the call control function writing call information to the call data block. In the example, the call information is the resource (2) 310B. The call control function will send a query using the call data block resource manager API 404 to set information in the call data block. The call data block is the resource manager table 406.

In step 508 data is retrieved or updated in the appropriate resource managers table 406. In order to retrieve data from or update a resource manager table 406, the resource manager 304 retrieves the reference pointer contained in the query that was sent in step 506, accesses the shared memory pointed to by the reference pointer, and retrieves data from shared memory needed to retrieve data from or update the resource manager table 406. In the example illustrated in FIG. 4, the resource manager (2) 304B retrieves the reference pointer in the query sent by resource requester (1) 306A in step 506, accesses the shared memory pointed to by the reference pointer, and retrieves the data from shared memory needed to retrieve data from or update the resource manager table (2) 406B.

After retrieving the data from shared memory, the resource manager 304 performs the requested resource manager API 404 procedure which involves retrieving information from or updating the resource manager table 406. In the example illustrated in FIG. 4, the resource manager (2) 304B performs the resource manager API (2) 404B procedure and retrieves information from or updates resource manager table (2) 406B.

For an exemplary request by the call control function to write information to the call data block, the call data block resource manager will retrieve the reference pointer from the query sent by the call control function (which is the resource requester 306). The call data block resource manager will access shared memory pointed to by the reference pointer and retrieve the data from shared memory to retrieve data from or update the call data block, which is the call data block resource manager table. Exemplary data includes a call identifier that can be used to access the call data block information for a particular call. The call data block resource manager will write the data to the call data block. The call data block resource manager API and call data block table will be described in further detail with respect to FIG. 6.

To ensure that multiple resource requesters 306 do not access the same information within a resource manager table 406, a semaphore variable is set if a resource requester 306 is accessing information. A semaphore variable is a variable that has two possible values, one value indicating that data may be accessed and another value indicating that data may not be accessed. Semaphore variables may control access of a table or of just one data element within a table. Semaphore variables are resources as they are needed for enhanced service call processing. Procedures for retrieving information about or updating semaphore variables are defined by the semaphore variable APIs. Information about semaphore variables, such as the value of the variable, is stored in a semaphore variable table.

In step 510 the resource manager 304 responds using the resource manager API 404. Completion of the execution of the resource manager API 404 results in return data which is the data requested and/or data indicating whether the transaction was successful. Also, the completion of the execution of the resource manager API 404 may result in an output, which is an action requested by the initiating routine. Neither return data nor output is necessary for successful processing by the resource management API 404 but may be useful in providing data and/or ensuring a transaction completed successfully.

Exemplary Resource Management Embodiment

A. Overview

Figure 6:
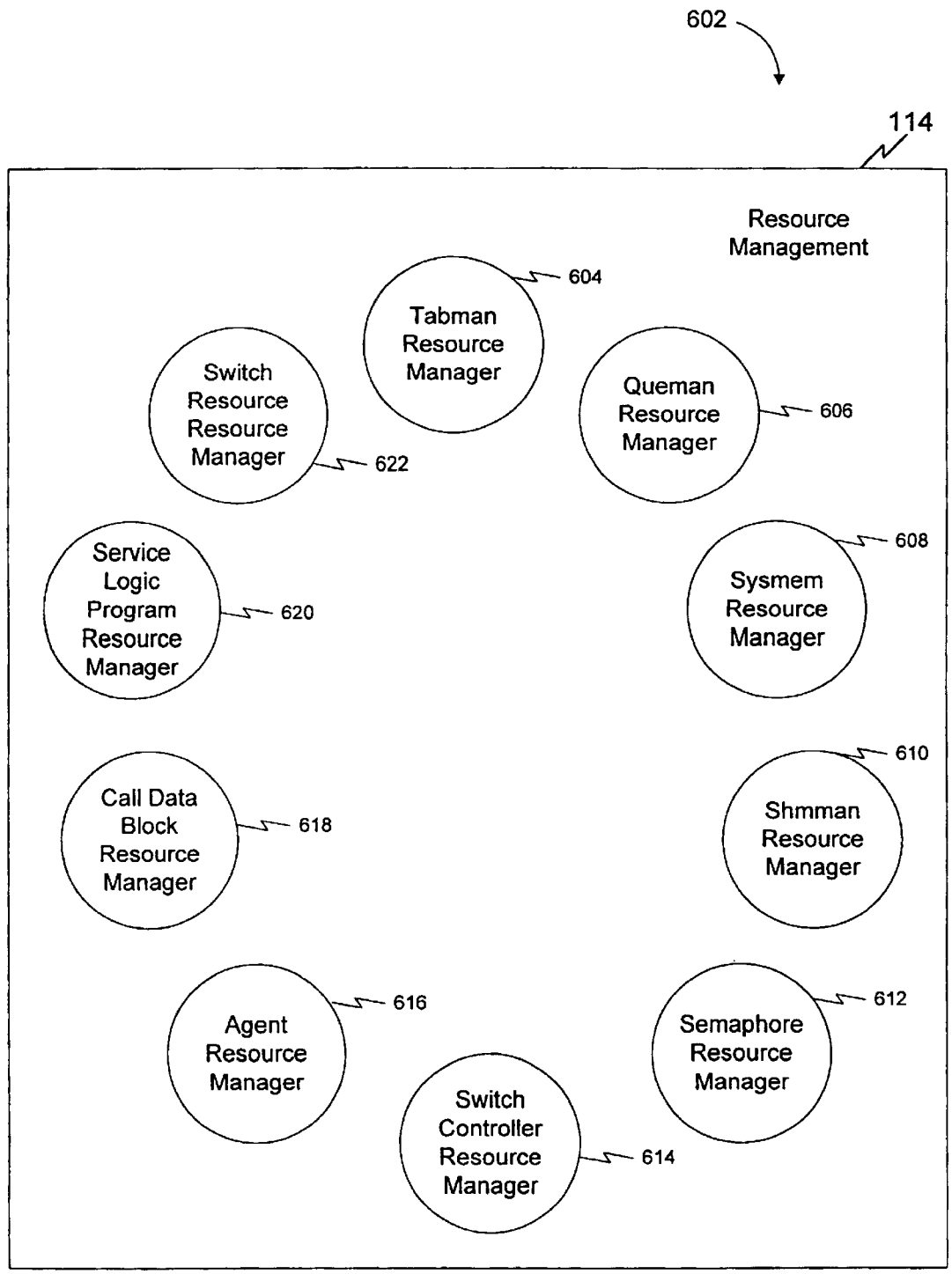
FIG. 6 is a diagram of an exemplary embodiment of resource management according to one embodiment of the present invention; and Tables 1–69 illustrate application programmer interfaces and data structures according to one embodiment of the present invention.

FIG. 6 is a block diagram 602 of an exemplary embodiment of a resource management 114. Resource management 114 includes numerous resource managers 604–622. In one embodiment, these resource managers include the tabman resource manager 604, queman resource manager 606, sysmem resource manager 608, shmman resource manager 610, semaphore resource manager 612, switch controller resource manager 614, agent resource manager 616, call data block resource manager 618, service logic program resource manager 620 and switch resource resource manager 622. These various resource managers are described in further detail in Tables 1–69.

of the information contained in the tables. The call data block resource manager 618 comprises call data block APIs and call data block resource manager tables. Call data block APIs are described in Table 9. Call data block APIs provide procedures for managing call data block information. Call data block information includes call related data obtained in processing a call and used to identify the call, elements of the call, such as the call legs, and provide information for billing the call, such as billing time points. The call data block resource manager tables are illustrated in Tables 33–36.

Exemplary cdb_GetCDBData API provides procedures for retrieving call data block information from the call data block table. Table 9 provides information about the call data block APIs. The first column provides the API name. In the exemplary API shown in the eighth row of Table 9, the first column indicates the name of the API is cdb_GetCDBData. The second column of Table 9 indicates the function. With respect the exemplary API cdb_GetCDBData, the function is to get a CDB's detailed data. The third column of Table 9 provides input parameters. For the exemplary API, cdb_GetCDBData, the inputs required are the 1 Cid, which is the call identifier, and the pstCDBData, which is the address of

TABLE 10 mRNAs decreased by age and returned to control levels by LT-CB

| GenBank | Phenotype |
|---|---|
| | Immune System |
| M30903 | B lymphocyte kinase (Blk); sac-family protein tyrosine kinase; plays important role in B-cell development/activities and immune responses; B-lineage cells |
| U43384 | Cytochrome b-245, beta polypeptide (Cybb, cytochrome b558); integral component of the microbicidal oxidase electron transport chain of phagocytic cells, respiratory burst oxidase; phagocytes |
| U10871 | Mitogen activated protein kinase 14 (Mapk14); signal transduction, stimulate phosphorytation of transcription factors; major upstream activator of MAPKAP kinas 2; hematopoietic stem cells |
| Z22649 | Myeloproliferative leukemia virus oncogene (Mp1); Member of hematopoietic cytokine receptor family, cell cycle regulator, induces proliferation and differentiation of hematopoietic cell lines; hematopoietic precursor cells, platelets and megakaryocytes |
| Y07521 | Potassium voltage gated channel, Show-related subfamily member 1 (Kene1) potassium channels with properties of delayed rectifiers; nervous system, skeletal system, T lymphocytes |
| U87456 | Flavin-containing monooxygenase 1 (Fmo1); xenobiotic metabolism; highly expressed in liver, lung, kidney, lower expressed in heart, spleen, testis, brain |
| U40189 | Pancreatic polypeptide receptor 1 (Ppyr1), neuropeptide Y receptor, peptide Y receptor; G-protein-coupled receptor; liver, gastrointestinal tract, prostate, aeurosa endocrine cells |
| | Neuron Specific |
| U16297 | Cytochrome b-561 (Cyb561); electron transfer protein unique to aeuroendocrine secretory vesicles; vectoral transmembrane electron transport; brain |
| D50032 | Trans-golgi network protein 2 (Tiga2); integral membrane protein localized to the Trans-Golgi network; involved in the budding of exocytic transport vesicles; brain neurons |
| | Liver Specific/Ubiquitous |
| D82019 | Basigin (Bag), CD147, neurothelin; membrane glycoprotein, immunoglobulin superfamily, homology to MIICs, acts as an adhesion molecule or a receptor, neural network formation and tumor progression; embryo, liver and other organs |
| U38990 | Glucokinase (Gk), key glycolytic enzyme; liver |
| U50631 | Heat-responsive protein 12 (Hrp12); heat-responsive, phosphorylated protein sequence similarity to Hbp20; liver, kidney |
| U39818 | Tuberous sclerosis 2 (Tsc2); mutationally inactivated in some families with tuberous sclerosis; encodes a large, membrane-associated GTPase activating protein (GAP tuberlin); may have a key role in the regulation of cellular growth; ubiquitous |

C. Description of Exemplary Resource Manager

The call data block resource manager 618 is described with respect to Table 9 to provide an exemplary illustration where the CDB data should be saved. The fourth column of Table 9 provides the output of the API. For the exemplary cdb_GetCDBData API, the output is saving the CDB data at the pstCDBData address. The fifth column provides the return of the API. For the exemplary cdb_GetCDBData API, the possible returns are: CDB_SUCCESS, CDB_SHM_NOT_ATTACH, CDB_KEY_INVALID, CDB_INPUT_ADDR_INVALID. CDB_LOCK_REC_ERR, and CDB_UNLOCK_REC_ERROR.

D. Description of Other Resource Managers

Additional resource managers are described in the tables. The semaphore resource manager 612 comprises semaphore APIs and semaphore resource manager tables. In Table 1, semaphore APIs are described. Semaphore APIs provide procedures for managing semaphore variables. Semaphore variables are UNIX constructs that lock and unlock memory segments. The semaphore variables within the switch controller 112 provide controlled access to data related to ISN resources. A set of semaphore variables is created for each table for access to the resource data stored in the table. Semaphore variables act as gatekeepers for memory by preventing multiple processes from accessing a particular memory segment simultaneously. The number of processes that may access a memory segment may be adjusted by modifying a configurable variable. The value of the configurable variable establishes the threshold value of the number of processes allowed access. Two locking schemes for semaphore variables are locking of an entire table and locking of one entry within a table. The semaphore resource manager tables may be any semaphore table such as those traditionally used with UNIX platforms.

The switch controller resource manager 614 comprises switch controller APIs and switch controller resource manager tables. The switch controller resource manager APIs and switch controller resource manager tables include (1) switch controller common library APIs, (2) operational measurements area APIs and tables, and (3) heartbeat APIs and tables.

In Table 2, switch controller common library APIs are described. The switch controller common library APIs affect the switch controller common library memory segment. The switch controller common library memory segment supports shared memory used to store heartbeat information and provides an operational measurements area where processes can deposit statistical data. Switch controller common library APIs are used to create and delete the switch controller common library memory segment. In addition, switch controller common library APIs are used by routines to attach and detach from the switch controller common library memory segment.

In Table 3, operational measurements area APIs are described. Operational measurements area APIs provide procedures for managing operational measurements data. Operational measurements data includes statistics of the components of the switch controller, such as disks, central processing unit (CPU) available memory, ports, and other similar data. Tables 12–18 provide additional information describing the tables used to store operational measurements data.

In Table 4, heartbeat table APIs are described. Heartbeat table APIs provide procedures for managing heartbeat data. Heartbeat functionality is used to monitor the health of the processes within the switch controller 112. A process manager routine within the management interface function is responsible for sending heartbeat requests to other switch controller application program routines 116 within certain intervals. The recipient switch controller application program routines 116 are responsible for responding to the heartbeat requests within established intervals. Process management determines when and what action should be taken when a process is not responding in a proper manner.

Heartbeat requests and responses are conveyed by setting request and response flags through shared memory. Heartbeating through shared memory is more efficient than heartbeating by sending messages through message queues because heartbeating through shared memory reduces the message volume within the switch controller.

Use of shared memory for heartbeating is described. The shared memory segment used to perform heartbeating is referred to as the heartbeat area. In one embodiment, one of the switch controller application program routines 116 is a process manager. A process manager oversees the heartbeating function and uses a resource management API to create the heartbeat shared memory segment. Within the shared memory segment, an entry is created for each switch controller application program routine 116. The entry contains heartbeat information, such as the switch controller application program routine identifier, heartbeat interval, heartbeat state (eg. register, request, or respond), request time stamp, and unresponded time and count. Heartbeat intervals can be set to different values for different switch controller application program routines 116. Table 18 provides an exemplary table used to store heartbeat data. Table 17 illustrates an exemplary control table used to control the heartbeat table.

The process manager brings up each of the other switch controller application program routines 116. The switch controller application program routines 116 attach to the heartbeat segment. To initiate processing with a particular switch controller application program routine 116, the process manager uses a resource management API to register each switch controller application program routine's 116 heartbeat entry and establishes its heartbeating interval. The interval may be modified using another resource management API.

The process manager informs each of the switch controller application program routines 116 of the need for heartbeating by sending a message with the switch controller application program routine's 116 heartbeat handle. The process manager calls a heartbeat request API to indicate a heartbeat request. When the routine 116 receives an initial heartbeat setup message, it immediately calls a respond heartbeat API. Each time a process calls a respond API, it will get a time which tells the process when it should next call the respond API. The routines 116 can get the current set heartbeat interval time using this API as well. When switch controller application program routines 116 exit, they detach from the memory segment. During switch controller 112 shutdown, a delete heartbeat segment is called to remove the segment from the system.

Additional resource managers are described in the tables. The agent resource manager 616 comprises agent APIs and agent resource manager tables. Agent APIs include APIs to manage agent, group, and agent assignment tables. Agent table, group table, and assignment tables are stored in one shared memory segment and share the same shared memory identifier. In Table 5, agent memory segment APIs are described. Agent memory segment APIs provide procedures for managing the agent memory segment. Agent memory segment APIs are used to create and delete the agent memory segment. In addition, agent memory segment APIs are used by routines to attach and detach from the agent memory segment.

In Table 6, agent table APIs are described. Agent table APIs provide procedures for managing agent tables. Agent tables include information about agents, such as terminal identifiers, agent logon identifiers, and associated groups. After an agent establishes a connection with the switch controller and logs on, its operating state in an agent table will be updated as capable of processing calls. In addition, after the agent logs off, its operating state will be changed to unable to handle calls. An agent API is provided to find an agent within a particular group. In addition, APIs to dynamically add and delete an agent entry are also provided. Tables 20–23 illustrate tables used to store information about agents. In addition, Tables 30–32 provide tables used to store general information about agents.

In Table 7, group table APIs are described. Group table APIs provide procedures for managing the group tables. Agents are grouped together according to their call processing functionalities. Agent group information includes information about the groups, agents assigned to the group and the number of calls queued to the group. Tables 24–26 illustrate tables used to store agent group information.

In Table 8, assignment table APIs are described. Assignment table APIs provide procedures for managing the assignment table. An agent group can have any number of agents assigned to it and an agent can be assigned to multiple groups. In order to describe the cross referencing between the agent table and group table, a separate agent assignment table is created. Tables 27–29 illustrate tables used to store agent assignment information.

The service logic program resource manager 612 comprises service logic program APIs and service logic program resource manager tables. In Table 10, service logic program APIs are described. Service logic program APIs provide procedures for managing the service logic program table. The service logic program table contains call identifier, call feature, call state and event information. The service logic program table is separate from the call data block. The service logic program table is organized on the service level. If a service logic program terminates abnormally, the service logic program can attach to this table and have access to most of the information needed about the calls in progress. Table 37 illustrates the table used to store service logic program data.

The switch resource resource manager 622 comprises switch APIs and switch resource manager tables. In Table 11, switch APIs are described. Switch APIs provide procedures for managing switch data.

Switch data includes switch matrix, card, node, span, trunk group, and other information related to the programmable switch 110 controlled by the switch controller 112. A switch matrix performs the switching functionality of interconnecting two channels, a channel from the caller and a channel to the receiver, in order to switch a call to a final destination. A card is a microprocessor chip board that is programmed to perform a specialized functionality. Cards within the programmable switch 110 are programmed with different software to perform various functions. Nodes are points of interconnection in a telecommunications network. Spans are telecommunications cables, typically fiber optic, however any medium capable of transmitting signals may used, that interconnect two components in a telecommunications network. Channels are bandwidth allocations that may be assigned to a particular call. Trunk groups are designations within software that are used for traffic routing purposes. Channels are assigned to trunk groups and a particular trunk group routes traffic between the destinations interconnected by the channels assigned. When a call is received, the destination number is used to select an appropriate trunk group and route the call via a channel assigned to the trunk group to the destination. Tables 38–59 provide additional information describing the tables used to store switch data.

While various embodiments of the present invention have been described above it should be understood that they have been presented by way of example only not limitation. Thus the breadth and scope of the present invention should not be remitted by any of the above described exemplary embodiments but should be defined only in accordance with the following claims and their equivalents.

TABLE 60

Tabman Client Table APIs

| API | Function | Input | Output | Return |
|---|---|---|---|---|
| Add Client | Add a NSPP client entry specified by client name and NIDS address to ciient. Return the client handle. | szClientName - client name pstClient Addr - client address | | Handle of the client or INVALID_HANDLE on error |
| AddUDPClient | Add a UDP client entry specified by client name and UDP address to client. Return the client handle. | szClient Name - client name pstClientUDPAddr - UDP client addr | | Handle of the client or INVALID_HANDLE on error |
| DeleteClient | Delete a client entry specified by client handle | hClientHandle - client handle | | INVALID_HANDLE - Handle is not valid TRUE - client entry is deleted CLIENT_HAS_SERVICE - Client has associated service, needs to delete that service before delete this entry |
| GetClientHandle | Look for a client entry specified by client name and NIDS address. | szClientName - client name pstClientAddr - client addr | | Client handle - found one match INVALID_HANDLE - no match |
| GetUDPClientHandle | Look for a client entry specified by client name and UDpaddress. | szClientName - client name pstClientUDPAddr - client addr | | Client handle - found one match INVALID_HANDLE - no match |

TABLE 60-continued

Tabman Client Table APIs

| API | Function | Input | Output | Return |
| --- | --- | --- | --- | --- |
| GetClientRecord | Copy one filed of a client's record to the place that pchBuffer points to. | hClientHandle - client handle<br>sOffset - offset of the field within the client table structure<br>sSize - size of that field<br>pchBuffer - buffer to copy the field to | pchBuffer | OK_CC or BAD_CC |
| GetClientData | Copy the whole record of one client. | hClientHandle - client handle<br>pstClTable - buffer to copy the client record to | pstClTable | OK_CC or BAD_CC |
| PutClientRecord | Update one field of a client table entry specified by client_handle. | hClientHandle - client handle<br>sOffset - offset of the field within the client table structure<br>sSize - size of that field<br>pchBuffer - buffer of client record to copy from | | OK_CC or BAD_CC |
| IncClientRecord | Increment one field of a client's record. | hClientHandle - client handle<br>sOffset - offset of the field within the client table structure<br>sSize - size of that field | | OK_CC or BAD_CC |
| DelClientFirstService | Delete the client's first service entry from service table and update this client entry's service_handle field. | RClientHandle - client handle | | OK_CC or BAD_CC |
| GetClientCount | Return total number of clients that connected to the Switch Controller. | None | | Number of clients connected to switch controller |
| ValidClient | Check whether the client handle is valid. | hClientHandle - client handle | | TRUE or FALSE |
| LockClient | Lock the specified client table entry to guarantee an exclusive access to this entry. | hClientHandle - client handle | | TRUE or FALSE - invalid handle |
| UnLockClient | Unlock the specified entry to allow other process to access to it. | hClientHandle - client handle | | TRUE or FALSE - invalid handle |
| GetClientPtr | Return the pointer to the table entry specified by client_handle. | hClientHandle - client entry handle | | Pointer to the table entry |
| ExternalClient | Check whether the client is from a different platform. | hClientHandle - client entry handle | | TRUE or FALSE |
| ThisClientHandle | Returns the current server handle. | None | | Server handle |
| BroadcastHandle | Returns the broadcast handle. | None | | Broadcast handle |

TABLE 61

Tabman Service Descriptor Table APIs

| API | Function | Input | Output | Return |
| --- | --- | --- | --- | --- |
| AddDesc | Add a service descriptor entry to the table. | uchDescType - descriptor type<br>szDescName - descriptor name | | The new entry handle or INVALID_HANDLE on error |
| DeleteDesc | Delete a service descriptor entry. | hDescHandle - descriptor entry handle | | INVALID_HANDLE - invalid handle<br>TRUE - entry delete<br>DESC_HAS_SERVICE - this entry still has pointer to service, entry not deleted |
| DelDescFirstService | Delete the first service entry in the service table this service descriptor entry points to. | hDescHandle - descriptor entry handle | | OK_CC or BAD_CC |
| GetDescHandle | Look for a service descriptor entry with the specified service name. | szDescName - descriptor name | | descriptor handle or INVALID_HANDLE - no match |
| GetDescRecord | Copy one field of a service descriptor entry to pchBuffer. | hDescHandle - descriptor entry handle<br>sOffset - offset of the field within the descriptor table structure<br>sSize - size of that field<br>pchBuffer - buffer to copy the field to | pchBuffer | OK_CC or BAD_CC |
| GetDescData | Copy the entire entry specified by desc_handle to buffer pointed to by buf.. | hDescRandle - descriptor entry handle<br>buf - descriptor entry record buffer pointer | buf | OK_CC or BAD_CC |
| GetDescAutoDel | Gets descriptor information from the Desc table. | hDescHandle - descriptor entry handle<br>puchSrvType - buffer to save service type<br>pfAutoDel Ctree info<br>pQhandle - queue handle | puchSrvType, pfAutoDel and pQhandle | OK_CC or BAD_CC |

TABLE 61-continued

Tabman Service Descriptor Table APIs

| API | Function | Input | Output | Return |
|---|---|---|---|---|
| PutDescRecord | Update one field of service descriptor table. | hDescflandte - descriptor entry handle<br>sOffset - offset of the field within the descriptor table structure<br>sSize - size of that field<br>pchBuffer - buffer to copy ffie field from | | OK_CC or BAD_CC |
| IncDescRecord | Increment one field of a descriptor table entry. | hDescHandle - descriptor handle<br>sOffset - offset of the field within the descriptor table structure<br>sSize - size of that field | | OK_CC or BAD_CC |
| GetDescCount | Get the service descriptor count. | None | | Number of service descriptor entries in table |
| GetDescStatus | Check the descriptor table status. | | | TRUE - changed from the last call<br>FALSE - no change |

TABLE 62

Tabman Service Table

| API | Function | Input | Output | Return |
|---|---|---|---|---|
| AddService | Add a service table entry in service table. | hClientHandle - client handle<br>hDescHandle - descriptor table handle | | Service handle<br>INVALID_HANDLE - invalid handle (error) |
| DeleteService | Delete the service table entry specified by its srvc_handle. | hServHandle - service table handle | | TRUE - deleted<br>INVALID_HANDLE - invalid handle (error) |
| GetServiceRecord | Copy one field of a service table entry to pchBuffer. | hServHandle - service entry handle<br>sOffset - offset of the field within the service table structure<br>sSize - size of that field<br>pchBuffer - buffer to copy the field to | pchBuffer | OK_CC or BAD_CC |
| GetServiceData | Copies an entire service record from the service table. Copies the DynShm pointed by service table to dbprocess local Dyn Shm Buffer. | hServerHandle - service table handle<br>pstsrvcTable - buffer to hold a service record<br>pchLocalDynShmBuff - local dynamic share memory buffer<br>usLocalDynShinBuffLen - size of the buffer<br>hClientHandle - client handle entry | pstSrvcTable, pchLocalDyn-ShmBuff | OK_CC or BAD_CC |
| PutServiceRecord | Puts a service record field to the table. | hServHandle - service entry handfe<br>sOffset - offset of the field within the service table structure<br>sSize - size of that field<br>pchBuffer - buffer to copy the field from | | OK_CC or BAD_CC |
| IncServiceRecord | Increments one field of the service record. | hServHandle - service entry handle<br>sOffset - offset of the field within the service table structure<br>sSize - size of that field | | OK_CC or BAD_CC |
| GetServiceCount | Get the number of service entries. | None | | Service count<br>BAD_CC on error |
| LockService | Lock the service entry. | hClientUandle - client handle<br>hServerffandle - service handle | | TRUE - locked<br>FALSE - invalid service handle |
| UnLockService | Unlock the service entry. | hClientHandle - client handle<br>hServerHandle - service handle | | TRUE - locked<br>FALSE - invalid service handle |

TABLE 63

Other Tabman APIs

| API | Function | Input | Output | Return |
|---|---|---|---|---|
| CreatTable | Used by startup process to create client, service descriptor and service tables. | usNoOfClients max number of client table entry<br>usNoOfSrvcs - max number ofservice table entry | | OK_CC or BAD_CC |

TABLE 63-continued

Other Tabman APIs

| API | Function | Input | Output | Return |
|---|---|---|---|---|
| | | usNoOfDescs - max number of descriptor table entry | | |
| AttachTable | Attach to client, service descriptor and service tables. | | | OK_CC or BAD_CC |
| TableCleanUp | Remove ctient, descriptor and service table share memory and semaphores from system. Current NIDS provides a set of semaphore operations. They are used to cooperate processes in accessing shared resources | None | | None |
| AttachSem | Lock the number usNoOfSem in the semaphore set. | sSemId - semaphore id of the semaphore set<br>usNoOfSem - offset of the semaphore | | None |
| DetachSem | Unlock the number usNoOfSem in the semaphore set. | sSemld - semaphore id of the semaphore set<br>usNoOfSem - offset of the semaphore | | None |

TABLE 67

TABMAN CLIENT TABLE DATA STRUCTURE

```
typedef struct ClientTableTyp
{
CHAR           achClientName[NIDS_CLIENT_NAME_LEN];
                                       /* client name                         */
USHORT         usAddressFamily;        /* NIBS address or UP address          */
NIDS_ADDRESS   stClientAddress;        /* client address
NIDS_UDP_SOCK_ADDRESS
               StClientUDPAddress;     /* client UP address                   */
ULONG          ulLastReceived;         /* last packet received time           */
SHORT          sWDCount;               /* unresponded watchdogs               */
USHORT         usCurrentPacketNum;     /* control data                        */
USHORT         usReceivedPacketNum;    /* last received packet sequence num.  */
USHORT         usLastSendablePacketNum;
                                       /* last sendable packet seq. num.      */
USHORT         usClientsLastSendable;
                                       /* client last sendable packet         */
VOID           *pstNewList;            /* new packet Iist                     */
VOID           *pstOldList;            /* old packet list                     */
BOOL           ProtectField;           /* used by table handler               */
BOOL           fClientused;            /* Client entry used                   */
USHORT         hServiceHandle;         /* Service Handle                      */
USHORT         hNextClientHandle;      /* handle of next client (used element) */
USHORT         hPrevClientHandle;      /* handle of Pre client (used element)  */
} ClientTableTyp;
```

TABLE 68

TABMAN SERVICE DESCRIPTOR TABLE DATA STRUCTURE

```
typedef struct DescTableTyp
CHAR           achServiceName[NIDS_SERVICE_NAME_LEN];
                                       /* service name                        */
UCHAR          uchServiceType;         /* service type flag                   */
BOOL           fDisabled;              /* service status                      */
USHORT         usConsoles;             /* number of clients                   */
QHAND          hQueueHandle;           /* handle ofprocess queue              */
VOID           *pvMessage;             /* pointer to any message that you     */
                                       /* may want to store                   */
ULONG          ulHostSendDiskQues;     /* Disk queues for a particular Hostsend */
ULONG          ulBdrSendDiskQues;      /* Disk queues for a particular Bdrsend */
DescTyp        stDesc;                 /* union of service description        */
BOOL           ProtectField;           /* used by table handler               */
BOOL           fserviceDescUsed;       /* Service Desc Used?                  */
USHORT         hServiceHandle;         /* handle to service table             */
```

TABLE 68-continued

TABMAN SERVICE DESCRIPTOR TABLE DATA STRUCTURE

```
USHORT       hNextDescHandle;     /* next service description    */
USHORT       hprevDescHandle;     /* Prev service description    */
} DescTableTyp;
```

TABLE 2

Amino Acid Substitutions

| Original Residue | Preferred Substitutions | Exemplary Substitutions |
|---|---|---|
| Ala (A) | Val | Val; Leu; Ile |
| Arg (R) | Lys | Lys; Gln; Asn |
| Asn (N) | Gln | Gln; His; Lys; Arg |
| Asp (D) | Glu | Glu |
| Cys (C) | Ser | Ser |
| Gln (Q) | Asn | Asn |
| Glu (E) | Asp | Asp |
| Gly (G) | Pro | Pro |
| His (H) | Arg | Asn; Gln; Lys; Arg |
| Ile (I) | Leu | Leu; Val; Met; Ala; Phe; norleucine |
| Leu (L) | Ile | norleucine; Ile; Val; Met; Ala; Phe |
| Lys (K) | Arg | Arg; Gln; Asn |
| Met (M) | Leu | Leu; Phe; Ile |
| Phe (F) | Leu | Leu; Val; Ile; Ala |
| Pro (P) | Gly | Gly |
| Ser (S) | Thr | Thr |
| Thr (T) | Ser | Ser |
| Trp (W) | Tyr | Tyr |
| Tyr (Y) | Phe | Trp; Phe; Thr; Ser |
| Val (V) | Leu | Ile; Leu; Met; Phe; Ala; norleucine |

TABLE 64

Queman APIs

| API | Function | Input | Output | Return |
|---|---|---|---|---|
| CreateDynamicQueue | Create a dynamic (not predefined processes) queue. This procedure will use a predefined directory, a file name generated by puchServiceNamePtr to generate a unique key and use this key to generate a queue ID. | | | |
| CreateStaticQueue | Create message queue for pre-defined processes and associated them with well know pseudo identifiers. | sProcessNumber - process number (well known queue ID) | actual queue id is updated in SYSVARs queue array | Queue handle |
| ReadMessageQueue | Read message from queue and save the message pointer to ppvMsgPointer. | sPQid - well know queue id uMsgType - message type lLongParm - specify what type of message should be read 0 - the first message on the queue should be returned >0 - the first message with a type equal to this long number should be returned <0 - the first message with the lowest type that is less than or equal to the absolute value of this long number ppvMsgPointer - message pointer sNoWait - blocking read or non-blocking read | usMsgType, ppvMsgPointer | OK_CC - read message successfully 1 - no message if QUEUE_NOWAIT is specified in sNoWait BAD_CC - no message if otherwise |
| WriteMessageQueue | Write a message to a queue. | sPQid - well know queue id usMsgType - message type pmsgMsgPointer - message pointer | | OK_CC or BAD_CC |

TABLE 64-continued

Queman APIs

| API | Function | Input | Output | Return |
|---|---|---|---|---|
| RemoveMessageQueue | Remove a queue from the system and update the queue id array, release message memory if there are still messages in the queue. | sPQid - well know queue ID | | OK_CC or BAD_CC |

TABLE 65

Sysmem APIs

| API | Function | Input | Output | Return |
|---|---|---|---|---|
| CreateShmSystemVars | Initially create the SYSVARS shared memory segment and semaphore. | None | | OK_CC or BAD_CC |
| AttachSysvarsSharedMem | Attach to the SYSVARS memory segment. | None | | OK_CC or BAD_CC |
| DetachSysvarsSharedMem | Detach from the SYSVARS memory segment. | puchSharedAddress - attached address | | OK_CC or BAD_CC |

TABLE 66

Shmman APIs

| API | Function | Input | Output | Return |
|---|---|---|---|---|
| InitDynShmPool | Creates and initializes one dynamic shared memory and one control segments. | usPool - SMALL or LARGE<br>ulSegSize - segment size<br>ulBlockSize - block size<br>usPartitions - number of partitions in the segment<br>ulVariableSize - the variable size partition size (There can be only one such partition segment) | | OK_CC or BAD_CC |
| AttnDynShmPool | Attaches to one dynamic shared memory pool. | usPool - SMALL or LARGE | | TRUE - attached<br>FALSE - error |
| AllocDynShmPool | Allocates blocks of memory from a dynamic shared memory pool. | ulSize - the size want to be allocated<br>usPool - SMALL or LARGE | | The address of the allocated block null - failed |
| GetDynShmAvailPool | Adds the available memory in each partition of a share memory segment and stores the result in the appropriate element of the AvailMem array in the system shared memory segment. | usPool - SMALL or LARGE | | None |
| FreeDynShmPool | Frees a block of memory in the specified memory pool. | pvBlockAddr - the address of the block<br>usPool - SMALL or LARGE | | OK_CC or BAD_CC |
| RemoveDynShmPool | Removes a dynamic shared memory pool. | usPool - SMALL or LARGE | | None |
| CombDynShmPool | Recombines contiguous idle blocks in the partitions that aren't coagulated in the specified pool. | usPool - SMALL or LARGE | | OK_CC or BAD_CC |

TABLE 1

SEMAPHORE APIs

| API | Function | Input | Return | Pseudo Code |
|---|---|---|---|---|
| Sem_Create Table Sem | Create a semaphore set for a table. | PsSem ID (where to same semaphore ID)<br>1Key (semaphore key)<br>US Max Table Entries (maximum number of table entries)<br>1SemFlag (semget flag to indicate access right of semaphore) | $\phi$: OK<br>−1: Error | |
| Sem_Init Table Sem | Initialize all the semaphores in a semaphore set. | Semaphore ID | 0: OK<br>−1: Error | |
| Sem_Delete Sem | Delete a semaphore set. | sSemId - (semaphore ID) | 0 - OK<br>−1 - on error | |
| Sem_Attach Sem | Get the semaphore ID of existing semaphore. | psSemId - (where to save the semphore ID)<br>1Key - (semaphore key)<br>1 SemFlag - (semget flag to indicating access right of the semaphore) | 0 - OK<br>−1 - on error | |

TABLE 1-continued

SEMAPHORE APIs

| API | Function | Input | Return | Pseudo Code |
|---|---|---|---|---|
| Sem_Lock Table | Lock the entire table. | sSemId - (semaphore ID)<br>sSemFlag - (semaphore operation flag, like SEM_UNDO) | 0 - OK<br>-1 - error | Wait until [0] is 1 and decrement it by 1 to indicate table lock request, also this will block all further record locking request. Wait until (1) to be 0. (Wait until no record locking to this table.) If the last two steps are successfully executed, the table is in force. |
| Sem_Unlock Table | Unlock the entire table. | sSemId - (semaphore ID)<br>sSemFlag - (semaphore operation flag, like SEM_UNDO) | 0 - OK<br>-1 - error | Check to make sure [0] is 0, which means table is locked. Increment [0] by 1 to release the table lock. |
| Sem_Lock Table Entry | Lock one entry of the table. | sSemId - semaphore ID<br>sTableEntryNo - table entry number (from 1 to ...)<br>sSemFlag - semaphore operation flag, like SEM_UNDO | 0 - OK<br>-1 - error | Wait [0] is 1 and decrement it by 1. (Wait until the table is not locked by others and lock it.) Increment [1] to increment the record locking counter. Increment [0] by 1 to release the entire table lock. Last three steps are one atomic operation, in this way the record locking requirement will be executed if the record is not locked or queued, so entire table lock request will be executed after this. In this way we implemented first come, first serve. Wait [X] to be 1 and decrement it by 1. After this step is successfully executed, the table entry is locked. |
| Sem_Unlock Table Entry | Unlock one entry of the table. | sSemId - (semaphore ID)<br>sTableEntryNo - (table entry no. (from 1 to ....))<br>sSemFlag - (semaphore operation flag, like SEM_UNDO) | 0 - OK<br>-1 - Error | Increment [X] by 1 to release the record locking. Decrement [1] to decrement the record locking counter. These two steps should be one atomic semaphore operation |
| Sem_Lock Sem One | Lock one entry of the semaphore. | sSemId - semaphore ID<br>sEntryNo - semaphore number (from 1 to ...)<br>sSemFlag - (semaphore operation flag, like SEM_UNDO) | 0 - OK<br>-1 - Error | wait [X] to be 1 and decrement it by 1. |
| Sem_Unlock Sem One | Unlock one entry of the semaphore. | sSemId - (semaphore ID)<br>sEntryNo - (semaphore entry no. (from 1 to ....))<br>sSemFlag - (semaphore operation flag, like SEM_UNDO) | 0 - OK<br>-1 - Error | Increment [X] by 1 to the lock. |
| Sem_Recover Table Sem | Reset table semaphore values locked by one process. This function is called to recover semaphore locking by a run away process, its previous process ID is needed. | sSemId - semaphore ID<br>1Pid - process ID | 0 - OK<br>-1 - on error | Get the semaphore size Check each record locking if it is locked, then check if it was locked by this process. If YES, release the lock |
| Sem_Get Sem Size | Get the size of semaphore set. | sSemId - semaphore ID<br>psSize - pointer to the buffer to save the size | 0 - OK<br>-1 - on error | |
| Sem_Get Table Sem Val | Get the semaphore value of a table entry. | sSemId - (semaphore ID)<br>usTableEntryNo - (table entry index)<br>pusVal - (pointer to the buffer to save the value) | Output;<br>pusVal - (semaphore value)<br>Return:<br>0 - OK<br>-1 - Error | |
| Sem_Print Sem | Print all the semaphore values of a semaphore set to a file. | sSemId - semaphore ID<br>fp - output file pointer | Return:<br>0 - OK<br>-1 - Error | |

TABLE 2

Switch Controller Common Library Memory Segment APIs

| API | Function | Input | Possible Returns |
|---|---|---|---|
| CM_Create CMSegment | Creates and initializes the sc_common shared memory segment, which is composed of OM area and heartbeat table. Creates and initializes semaphore sets for OM and HB. Primarily used by | USMaxNoOf HBEntry - maximum number of HB entries | CM_SUCCESS<br>CM_FAIL |

TABLE 2-continued

Switch Controller Common Library Memory Segment APIs

| API | Function | Input | Possible Returns |
|---|---|---|---|
| | the process manager. | | |
| DM_Delete CMSegment | Deletes the sc_common share memory segment and its semaphore sets. | None | CM_SUCCESS CM_FAIL |
| CM_Attach CMSegment | Attaches to the sc_common share memory segment. | None | CM_SUCCESS CM_FAIL |
| CM_Detach CMSegment | Detaches from sc_common segment. | None | CM_SUCCESS CM_FAIL |

TABLE 3

Operational Measurements Area APIs

| API | Function | Input | Return |
|---|---|---|---|
| CM_SetupOMIPC | Setup SC System shared memory and semaphore loop. | None | CM_SUCCESS CM_FAIL |
| CM_UpdateOMIPC | Read share memory and semaphore information (ID and size etc.). | None | CM_SUCCESS CM_FAIL |
| CM_PrintOMIPC | Print IPC information to a file or stdout. | FP - (file pointer) | CM_SUCCESS CM_FAIL |
| CM_GetOMAttr | Returns one attribute value of OM entry per function call. | Every attribute specification is composed of three elements: (1) an attribute constant, (2) an attribute value pointer, and (3) an attribute size pointer. Attribute constants are as follows: CM_OM_ATTR_TERMINATOR (to terminate argument list) CM_OM_ATTR_AGENT_TOTAL CM_OM_ATTR_AGENT_DISCONNECT CM_OM_ATTR_AGENT_CONNECT CM_OM_ATTR_AGENT_READY CM_OM_ATTR_AGENT_BUSY CM_OM_ATTR_CALL_QUEUED_TOTAL CM_OM_ATTR_PORT_TOTAL CM_OM_ATTR_PORT_CONFERENCE CM_OM_ATTR_PORT_OUT CM_OM_ATTR_PORT_IN CM_OM_ATTR_PORT_HOLD | CM_SUCCESS CM_SHM_NOT_ATTACH - share memory segment not exist CM_INPUT_ADDR_INVALID CM_ATTR_INVALID CM_INPUT_SIZE_INVALID CM_OM_LOCK_AREA_ERR CM_OM_UNLOCK_AREA_ERR |
| CM_SetOMAttr | Set OM data fields. | CM_ATTR_MODIFY_MODE_INC CM_ATTR_MODIFY_MODE_DEC CM_ATTR_MODIFY_MODE_CLEAR CM_ATTR_MODIFY_MODE_SET | CM_SUCCESS CM_SHM_NOT_ATTACH - share memory segment not exist CM_INPUT_ADDR_INVALID CM_ATTR_INVALID CM_ATTR_MODIFY_MODE_INVALID CM_INPUT_SIZE_INVALID CM_OM_LOCK_AREA_ERR CM_OM_UNLOCK_AREA_ERR |

TABLE 4

Heartbeat Table APIs

| API | Function | Input | Output | Return | Calling Function |
|---|---|---|---|---|---|
| CM_GetTime | Returns the time since 00:00:00 GMT, January 1, 1970 measured in miniseconds. | None | | Current time | |
| CM_CreateHBTable | Create and initialize heartbeat table and its semaphore set. | usMaxNoOfHbEntry- maximum no. of entries in heartbeat table | | CM_SUCCESS CM_FAIL | Internal API |

TABLE 4-continued

Heartbeat Table APIs

| API | Function | Input | Output | Return | Calling Function |
| --- | --- | --- | --- | --- | --- |
| CM_DeleteHBTable | Remove heartbeat share memory segment and its semaphore set. | | | CM_SUCCESS<br>CM_FAIL | Internal API |
| CM_AttachHBTable | Attach to heartbeat table segment and its semaphore set. | None | | CM_SUCCESS<br>CM_FAIL | Internal API |
| CM_DetachHBTable | Detach from heartbeat table segment and its semaphore set. | | | CM_SUCCESS<br>CM_FAIL | Internal API |
| CM_CreateHBEntry | Create a heartbeat entry in the heartbeat area. | phHBHandle - heartbeat handle pointer<br>1Pid - Process Id.<br>UsInterval - heartbeat interval for that process | | CM_SUCCESS<br>CM_SHM_NOT_ATTACH - share segment not attached<br>CM_HB_TABLE_FULL - heartbeat table is full<br>CM_FAIL - locking or unlocking error | Process Manager |
| CM_DeleteHBEntry | Delete a heartbeat entry from heartbeat table. | hHBHandle - heartbeat handle | | CM_SUCCESS<br>CM_SHM_NOT_ATTACH - share segment not attached<br>CM_HB_HANDLE_INVALID - handle is not valid<br>CM_FAIL - locking or unlocking error | |
| CM_GetHBHandle | Returns the heartbeat handle of a registered process. | phHBHandle - heartbeat handle pointer<br>Ipid - process ID | | CM_SUCCESS<br>CM_SHM_NOT_ATTACH - share segment not attached.<br>CM_HB_KEY_INVALID - couldn't find heartbeat table entry for the process<br>CM_FAIL - locking or unlocking error | |
| CM_RequestHB | Heartbeat state will change to request, a request time stamp will be filled in the entry. The heartbeat unresponded count and time will be updated by this function if needed. | hHBHandle - process heartbeat handle<br>pusUnrspCount - where to save unresponded count<br>pusInterval - interval pointer (can be null) | if psInterval is not NULL, it will contain the current interval<br>psUnrspCount - unresponded HB count | CM_SUCCESS<br>CM_SHM_NOT_ATTACH - share segment not attached<br>CM_HB_HANDLE_INVALID - handle is not valid<br>CM_FAIL - locking or unlocking error | Process Manager |
| CM_RespondHB | Indicates a heartbeat respond, a respond time stamp will be filled unresponded count and time will be cleared. | hHBHandle - process heartbeat handle<br>pdNextRspTime - where to save next respond time<br>pusInterval - interval pointer (can be null) | if psInterval is not NULL, it will contain the current interval<br>psNextRspTime - next respond time | CM_SUCCESS<br>CM_SHM_NOT_ATTACH - share segment not attached<br>CM_HB_HANDLE_INVALID - handle is not valid<br>CM_FAIL - locking or unlocking error | Responding Process |
| CM_SetHBInterval | Set the heartbeat interval in the share memory. | hHBHandle - heartbeat handle<br>usInterval - new heartbeat interval | | CM_SUCCESS<br>CM_SHM_NOT_ATTACH - share segment not attached<br>CM_HB_HANDLE_3INVALID - handle is not valid<br>CM_FAIL - other error | Process Manager |
| CM_GetHBAttr | Returns one attribute value of heartbeat entry per function call. | hHBHandle - to specify the entry<br>sAttr - to specify the attribute.<br>Possible values are:<br>HB_ATTR_INTERVAL,<br>HB_ATTR_UNRSPCOUNT,<br>HB_ATTR_UNRSPTIME<br>pvAttrValue - when the attribute value will be returned<br>ulAttrSize - size of pvAttrValue | pvAttrValue - the attribute value<br>ulAttrSize - the actual attribute size | CM_SUCCESS<br>CM_SHM_NOT_ATTACH - share segment not attached<br>CM_HB_HANDLE_INVALID<br>CM_INPUT_ADDR_INVALID<br>CM_ATTR_INVALID<br>CM_INPUT_SIZE_INVALID | |
| CM_PrintHBTable | Print heartbeat table summary and contents. | File pointer to hold the trace info | | None | |

TABLE 12

Switch Controller Common Library Table
Operational Measurements Area
IPC Table
(Contains information pertaining to shared memory,
queues, and semaphores.)

| Field | | | | |
|---|---|---|---|---|
| ch Name | IPC 1 | IPC 2 | ... | IPC n |
| l Key | | | | |
| l Id (Identifier) | | | | |
| l Size | | | | |
| l Create Time | | | | |

TABLE 13

Switch Controller Common Library Table
Operational Measurements Area
Switch Controller CPU Availability

| Field | CPU A | CPU B | ... | CPU n |
|---|---|---|---|---|
| l Startup Time | | | | |
| us Available CPU (percent) | | | | |
| us Waiting CPU (percent) | | | | |
| ul Total Memory | | | | |
| ul Available Memory | | | | |
| st Disk | pointer to st Disk table | pointer to st Disk table | | pointer to st Disk table |

TABLE 14

Switch Controller Common Library Table
Operational Measurements Area
Disk Availability

| Field | | | | |
|---|---|---|---|---|
| ch Name | Disk 1 | Disk 2 | ... | Disk n |
| Total | | | | |
| Available | | | | |

\* 2–8 disks per CPU typical

TABLE 15

Switch Controller Common Library
Operational Measurements Area
Agent Operational Measurement Counts

| Field | Counts |
|---|---|
| ul Agent Total | |
| ul Agent Disconnect | |
| ul Agent Connect | |
| ul Agent Ready | |
| ul Agent Busy | |

TABLE 16

Switch Controller Common Library
Operational Measurements Area
Switch Port Operational Measurement
Counts
for a Switch Controller

| Field | Counts |
|---|---|
| ul Port Total | |
| ul Port Conference | |

TABLE 16-continued

Switch Controller Common Library
Operational Measurements Area
Switch Port Operational Measurement
Counts
for a Switch Controller

| Field | Counts |
|---|---|
| ul Port Out | |
| ul Port In | |
| ul Port Hold | |

TABLE 17

Switch Controller Common Library
Control Table For Heartbeat Table

| Field | Value | Comments |
|---|---|---|
| us Max Element | | max element index in the table |
| us Use Element | | first element in the used list |
| us Free Element | | first element in the unused list |
| us Use Counts | | element count |
| us Stand Alone | | table is a standalone segment flag |

TABLE 18

Switch Controller Common Library
Heartbeat Table

| Field | | | | | Comments |
|---|---|---|---|---|---|
| l Pid | Process 1 | Process 2 | ... | Process n | Process Identifier |
| s State | | | | | May be register, request or respond |
| us Interval | | | | | Heartbeat interval |
| us Half Interval | | | | | Half of the heartbeat interval |
| d Request Time | | | | | Last request time stamp |
| us Unrsp Count | | | | | Heartbeat unrespond counter |
| us Unrsp time | | | | | Unresponded elapsed time |
| h Prev Handle | | | | | Previous handle |
| h Next Handle | | | | | Next handle |
| ch Entry Used | | | | | Entry used flag |

TABLE 19

Agent Library
Control Table for Agent Table

| Field | Value | Comments |
|---|---|---|
| us Max Element | | Max element index in the table |
| us Use Element | | First element in the used list |
| us Free Element | | First element in the unused list |
| us Use Counts | | Element count |
| us Stand Alone | | Table is a stand alone segment flag |
| st Agent Count | | Agent count |

TABLE 5

Agent Memory Segment APIs

| API | Function | Calling Process | Input | Return |
|---|---|---|---|---|
| Agt_CreateAgentSegment | Create and initialize a stand alone share memory segment and semaphore sets for agent table, group table and assignment table. Read in table records. | Process Manager | usMaxClients - max no of client table entries (used to decide the size of client-agent mapping table size) | AGT_SUCCEED AGT_FAIL |
| Agt_DeleteAgentSegment | Remove agent share memory segment and its semaphore sets. | Process Manager | | AGT_SUCCEED AGT_FAIL |
| Agt_AttachAgentSegment | Attach to agent segment and its semaphore sets. | Any process other than the Process Manager | | AGT_SUCCEED AGT_FAIL |
| Agt_DetachAgentSegment | Detach the agent share memory segment. | Processes that attached before | | AGT_SUCCEED AGT_FAIL |

TABLE 6

Agent Table APIs

| API | Function | Input | Output | Return |
|---|---|---|---|---|
| Agt_CreateAgentEntry | Create an entry into the Agent table. | phAgentHandle - agent handle pointer stAgentData - agent info, including TID | Search entry created in agent search table. | AGT_SUCCESS<br>AGT_SHM_NOT_ATTACH<br>AGT_LOCK_AGENT_TABLE_ERR<br>AGT_UNLOCK_AGENT_TABLE_ERR<br>AGT_AGENT_TABLE_FULL |
| Agt_DeleteAgentEntry | Delete an agent entry from agent table. | ITid - TID of agent | Search entry deleted. | AGT_SUCCESS<br>AGT_SHM_NOT_ATTACH<br>AGT_LOCK_AGENT_TABLE_ERR<br>AGT_UNLOCK_AGENT_TABLE_ERR<br>AGT_AGENT_KEY_INVALID<br>AGT_AGENT_HAS_ASSIGNMENT |
| Agt_UpdateAgentState | Update an agent's call processing state. | hClientHandle - client handle of the agent<br>ITid - TID of agent<br>sState - new state, can be one of the following values:<br>AGT_AGENT_STATE_DISCONNECT<br>AGT_AGENT_STATE_CONNECT<br>AGT_AGENT_STATE_READY<br>AGT_AGENT_STATE_BUSY<br>pch Queued - if update a state to READY, this field will be used to notify the caller whether a call is queued on groups that agent belongs to. | Agent s state field updated.<br>pchQueued - can be one of the two values:<br>AGT_CALL_QUEUED_YES<br>AGT_CALL_QUEUED_NO | AGT_SUCCESS<br>AGT_SHM_NOT_ATTACH<br>AGT_CLIENT_HANDLE_INVALID<br>AGT_AGENT_KEY_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_AGENT_STATE_INVALID |
| Agt_AgentSelect | Select an agent which is in READY state. | puchGroupNum - the group to select from<br>sSelectMode - mode of selection:<br>AGT_AGENT_SELECT_MODE_FIRST_READY - choose first available agent<br>AGT_AGENT_SELECT_MODE_MOST_IDLE - choose the most idle agent<br>phClientHandle - address to hold the agent's handle<br>pstAgentData - address to hold the agent's data | AGT_AGENT_KEY_INVALID | AGT_SUCCESS<br>AGT_SHM_NOT_ATTACH<br>AGT_CLIENT_HANDLE_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_NO_AGENT_AVAILABLE<br>AGT_NO_AGENT_ASSIGNED<br>AGT_NO_AGENT_LOGIN<br>AGT_GROUP_KEY_INVALID<br>AGT_AGENT_SELECT_MODE_INVALID<br>AGT_INPUT_ADDRESS_NULL |
| Agt_AgentDNToTid | Agent destination number to TID conversion API. | puchAgentDestNum - agent DN<br>pITid where to save TID<br>phClientHandle - where to save client handle | pITid - TID of the agent with that DN<br>phClientHandle - client handle | AGT_SUCCESS<br>AGT_SHM_NOT_ATTACH<br>AGT_AGENT_DN_INVALID<br>AGT_LOCK_AGENT_TABLE_ERR<br>AGT_UNLOCK_AGENT_TABLE_ERR |
| Agt_GetAgentData | Get an agent's detail data. | (Choose either hClientHandle or ITid to as input to identify the agent)<br>hClientHandle - client handle of agent<br>ITid - TID of agent<br>stAgentData - agent data | stAgentData - returned agent data | AGT_SUCCESS<br>AGT_SHM_NOT_ATTACH<br>AGT_CLIENT_HANDLE_INVALID<br>AGT_AGENT_KEY_INVALID<br>AGT_LOCK_AGENT_TABLE_ERR |

TABLE 6-continued

Agent Table APIs

| API | Function | Input | Output | Return |
|---|---|---|---|---|
| | | | | AGT_UNLOCK_AGENT_TABLE_ERR |
| | | | | AGT_LOCK_AGENT_REC_ERR |
| | | | | AGT_UNLOCK_AGENT_REC_ERR |
| | | | | AGT_INPUT_ADDR_INVALID |
| Agt_SetAgentData | Update an agent's stAgentData field. | (Choose either hClientHandle or lTid to as input to identify the agent) hClientHandle - client handle of agent lTid - TID of agent stAgentData - agent data | agent's stAgentData field updated | AGT_SUCCESS<br>AGT_SHM-NOT-ATTACH<br>AGT_CLIENT-HANDLE_INVALID<br>AGT_AGENT_KEY_INVALID<br>AGT_LOCK_AGENT_TABLE_ERR<br>AGT_UNLOCK_AGENT_TABLE_ERR<br>AGT_LOCK_AGENT_REC_ERR<br>AGT_UNLOCK_AGENT_REC_ERR<br>AGT_INPUT_ADDR_INVALID |
| Agt_GetAgentAttr | Get only one field of stAgentData per function call. | (Choose either hClientHandle or lTid to as input to identify the agent) hClientHandle - client handle of agent lTid - TID of agent sAttr - to specify attribute. Possible values are. AGT_ATTR_AGENT-STATE AGT_ATTR_AGENT_DN pvAttrValue - where the attribute value will be returned ulAttrSize - size of pvAttrValue. | pvAttrValue - attribute value ulAttrSize - the actual attribute size | AGT_SUCCESS<br>AGT_SHM_NOT_ATTACH<br>AGT_CLIENT_HANDLE_INVALID<br>AGT_AGENT_KEY_INVALID<br>AGT_LOCK_AGENT_TABLE_ERR<br>AGT_UNLOCK_AGENT_TABLE_ERR<br>AGT_INPUT_ADDR_INVALID<br>AGT_INPUT_SIZE_INVALID<br>AGT_AGENT_ATTR_INVALID |
| Agt_SetAgentAttr | Set only one field of stAgentData per function call. | (Choose either hClientHandle or lTid as input to identify the agent. hClientHandle - client handle of agent lTid - Tid of agent sAttr - to specify attribute. Possible value are; AGT_ATTR_AGENT_STATE AGT_ATTR_AGENT_DN AGT_ATTR_AGENT_CATEGORY pvAttrValue - where the attribute value will be returned ulAttrSize - size of pvAttrValue. | PvAttrValue - the attribute value | AGT_SUCCESS<br>AGT_SHM_NOT_ATTACH<br>AGT_CLIENT_HANDLE_INVALID<br>AGT_AGENT_KEY_INVALID<br>AGT_LOCK_AGENT_TABLE_ERR<br>AGT_UNLOCK_AGENT_REC_ERR<br>AGT_LOCK_AGENT_REC_ERR<br>AGT_UNLOCK_AGENT_REC_ERR<br>AGT_INPUT_ADDR_INVALID<br>AGT_INPUT_SIZE_INVALID<br>AGT_INVALID_AGENT_ATTR |
| Agt_GetAgentHandle | Locate an agent by its TID. | lTid - TID phAgentHandle - where to save agent handle | | AGT_SUCCESS<br>AGT_SHM_NOT_ATTACH<br>AGT_AGENT_KEY_INVALID<br>AGT_LOCK_AGENT_TABLE_ERR<br>AGT_UNLOCK_AGENT_TABLE_ERR |
| Agt_GetAgentCounts | Gets the number of agents in the agent table. | pstAgentCount - address to save the agent count information | | AGT_SUCCESS<br>AGT_SHM_NOT_ATTACH<br>AGT_INPUT_ADDR_INVALID<br>AGT_LOCK_AGENT_TABLE_ERR<br>AGT_UNLOCK_AGENT_TABLE_ERR |

TABLE 6-continued

Agent Table APIs

| API | Function | Input | Output | Return |
|---|---|---|---|---|
| Agt_PrintAgentTable | Print agent table summary and contents. | fp - file pointer to hold the trace info. | | None |
| Agt_PrintAgentEntry | Print the contents of one agent table entry. | (Choose either hClientHandle or lTid to as input to identify the agent) hClientHandle - client handle of agent lTid - TID of agent | | AGT_SUCCESS AGT_SHM_NOT_ATTACH AGT_AGENT_KEY_INVALID AGT_CLIENT_HANDLE_INVALID |
| Agt_PrintAgentSearchTable | Print agent search table contents. | fp - file pointer to hold the trace info. | | None |

TABLE 7

Group Table APIs

| API | Function | Input | Output | Return |
|---|---|---|---|---|
| Agt_CreateGroupEntry | Add an entry into the Group table. | phGroupHandle - group handle pointer stGroupData - group data including group number(key) | Search table entry is created. | AGT_SUCCESS<br>AGT_SHM_NOT_ATTACH<br>AGT_LOCK_GROUP_TABLE_ERR<br>AGT_UNLOCK_GROUP_TABLE_ERR<br>AGT_GROUP_TABLE_FULL |
| Agt_DeleteGroupEntry | Delete a group entry from group table. | puchGroupNum - group number of the group | Ssearch table entry deleted. | AGT_SUCCESS<br>AGT_SHM_NOT_ATTACH<br>AGT_LOCK_GROUP_TABLE_ERR<br>AGT_UNLOCK_GROUP_TABLE_ERR<br>AGT_GROUP_KEY_INVALID<br>AGT_GROUP_HAS_ASSIGNMENT |
| Agt_GetGroupHandle | Locate a group by its group number. | phGroupHandle - group handle pointer<br>puchGroupNum - group number | | AGT_SUCCESS<br>AGT_SHM_NOT_ATTACH<br>AGT_LOCK_GROUP_TABLE_ERR<br>AGT_UNLOCK_GROUP_TABLE_ERR<br>AGT_GROUP_KEY_INVALID |
| Agt_GetGroupData | Get an group's detail data. | puchGroupNum - group number of the group<br>pstGroupData - group data storage pointer | | AGT_SUCCESS<br>AGT_SHM_NOT_ATTACH<br>AGT_LOCK_GROUP_TABLE_ERR<br>AGT_UNLOCK_GROUP_TABLE_ERR<br>AGT_GROUP_KEY_INVALID<br>AGT_INPUT_ADDR_INVALID<br>AGT_LOCK_GROUP_REC_ERR<br>AGT_UNLOCK_GROUP_REC_ERR |
| Agt_SetGroupData | Update a group's stGroupData field. | puchGroupNum - group number of the group<br>stGroupData - new group data | | AGT_SUCCESS<br>AGT_SHM_NOT_ATTACH<br>AGT_LOCK_GROUP_TABLE _ERR<br>AGT_UNLOCK_GROUP_TABLE_ERR<br>AGT_GROUP_KEY_INVALID<br>AGT_INPUT_ADDR_INVALID<br>AGT_LOCK_GROUP_REC_ERR<br>AGT_UNLOCK_GROUP_REC_ERR |
| Agt_IncreaseCallsQueuedOnGroup | Increase number of calls queued for a group. | puchGroupNum - group number | | AGT_SUCCESS<br>AGT_SHM_NOT_ATTACH<br>AGT_LOCK_GROUP_TABLE_ERR<br>AGT_UNLOCK_GROUP_TABLE_ERR<br>AGT_GROUP_KEY_INVALID |
| Agt_DecreaseCallsQueuedonGroup | Decrease number of calls queued for a group. | puchGroupNum - group number | | AGT_SUCCESS<br>AGT_SHM_NOT_ATTACH<br>AGT_LOCK_GROUP_TABLE_ERR<br>AGT_UNLOCK_GROUP_TABLE_ERR<br>AGT_GROUP_KEY_INVALID |
| Agt_GetGroupCount | Gets the number of groups in the group table. | pusCount - count address | | AGT_SUCCESS<br>AGT_SHM_NOT_ATTACH<br>AGT_INPUT_ADDR_INVALID |
| Agt_PrintGroupTable | Print group table summary and contents. | fp - file pointer to hold the trace info. | | None |
| Agt_PrintGroupEntry | Print the content of one group table entry. | puchGroupNum - group number of the group<br>fp - file pointer to hold the information | | |
| Agt_PrintGroupSearchTable | Print group search table contents. | fp - file pointer to hold the trace info. | | None |

TABLE 8

Assignment Table APIs

| API | Function | Input | Return |
|---|---|---|---|
| Agt_CreateAssignEntry | Add entry into the Assign table. | phAssignHandle - assign handle pointer<br>1Tid - TID of agent<br>uchGroupNum - group number of group<br>stAssignData - other assignment related info | AGT_SUCCESS<br>AGT_SHM_NOT_ATTACH<br>AGT_AGENT_KEY_INVALID<br>AGT_GROUP_KEY_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_LOCK_ASSIGN_TABLE_ERR<br>AGT_UNLOCK_ASSIGN_TABLE_ERR<br>AGT_LOCK_AGENT_REC_ERR |

TABLE 8-continued

Assignment Table APIs

| API | Function | Input | Return |
|---|---|---|---|
| Agt_DeleteAssignEntryByKeys | Delete an assign entry from assign table. | 1Tid - TID of agent<br>puchGroupNum - group number of group | AGT_UNLOCK_AGENT_REC_ERR<br>AGT_ASSIGN_TABLE_FULL<br>AGT_SUCCESS<br>AGT_SRM_NOT_ATTACH<br>AGT_AGENT_KEY_INVALID<br>AGT_GROUP_KEY_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_LOCK_ASSIGN_TABLE_ERR<br>AGT_UNLOCK_ASSIGN_TABLE_ERR<br>AGT_LOCK_AGENT_REC_ERR<br>AGT_UNLOCK_AGENT_REC_ERR |
| Agt_DeleteAgentAssign | Delete all of one agent's assignment entries. | hClientHandle - client handle of the agent 1Tid - TID of agent | AGT_SUCCESS<br>AGT_SHM_NOT_ATTACH<br>AGT_AGENT_KEY_INVALID<br>AGT_GROUP_KEY_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_LOCK_ASSIGN_TABLE_ERR<br>AGT_UNLOCK_ASSIGN_TABLE_ERR<br>AGT_LOCK_AGENT_REC_ERR<br>AGT_UNLOCK_AGENT_REC_ERR |
| Agt_DeleteGroupAssign | Delete all of one group's assignment entries. | puchGroupHandle - group number of the group | AGT_SUCCESS<br>AGT_SHM_NOT_ATTACH<br>AGT_AGENT_KEY_INVALID<br>AGT_GROUP_KEY_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_LOCK_ASSIGN_TABLE_ERR<br>AGT_UNLOCK_ASSIGN_TABLE_ERR<br>AGT_LOCK_AGENT_REC_ERR<br>AGT_UNLOCK_AGENT_REC_ERR |
| Agt_GetAssignByKeys | Locate an assignment by its TID and GroupNum. | 1Tid - agent TID<br>puchGroupNum - group number | AGT_SUCCESS<br>AGT_SHM_NOT_ATTACH<br>AGT_AGENT_KEY_INVALID<br>AGT_GROUP_KEY_INVALID<br>AGT_LOCK_AGENT_TABLE_ERR<br>AGT_UNLOCK_AGENT_TABLE_ERR<br>AGT_LOCK_GROUP_TABLE_ERR<br>AGT_UNLOCK_GROUP_TABLE_ERR<br>AGT_LOCK_ASSIGN_TABLE_ERR<br>AGT_UNLOCK_ASSIGN_TABLE_ERR<br>AGT_LOCK_AGENT_REC_ERR<br>AGT_UNLOCK_AGENT_REC_ERR<br>AGT_ASSIGN_NO_MATCH |
| Agt_GetAssignCount | Gets the number of assigns in the assign table. | pusCount - total assignments | AGT_SUCCESS<br>AGT_SHM_NOT_ATTACH |
| Agt_GetAgentAssignCount | Gets the number of assignments for a particular agent. | hClientHandle - client handle of an agent 1Tid - TID of an agent<br>pusCount - address to put count | AGT_SUCCESS<br>AGT_SHM_NOT_ATTACH<br>AGT_AGENT_KEY_INVALID<br>AGT_CLIENT_HANDLE_INVALID<br>AGT_LOCK_AGENT_TABLE_ERR<br>AGT_UNLOCK_AGENT_TABLE_ERR<br>AGT_LOCK_ASSIGN_TABLE_ERR<br>AGT_UNLOCK_ASSIGN_TABLE_ERR |
| Agt_GetGroupAssignCount | Gets the number of agents that assigned to a specified group. | puchGroupNum - group number of the group<br>pusCount where to save count | AGT_SUCCESS<br>AGT_SHM_NOT_ATTACH<br>AGT_GROUP_KEY_INVALID<br>AGT_LOCK_GROUP_TABLE_ERR<br>AGT_UNLOCK_GROUP_TABLE_ERR<br>AGT_LOCK_ASSIGN_TABLE_ERR<br>AGT_UNLOCK_ASSIGN_TABLE_ERR |
| Agt_PrintAssignTable | Print assignment table summary and contents. | fp - file pointer to hold the trace info. | None |

TABLE 20

Agent Library
Agent Table

| Field | Comments |
|---|---|
| st Agent Data | Agent data substructure |
| h Assigned | Assigned groups |
| h Client Handle | Client handle |
| h Prev Handle | Previous agent handle |
| h Next Handle | Next agent handle |
| ch Entry Used | Entry used flag |

Agent Library
Agent Attributes Table

| Field | | | | | Comments |
|---|---|---|---|---|---|
| I Tid | Agent Tid 1 | Agent Tid 2 | ... | Agent Tid n | Agent terminal identifier |
| st Agent DN | | | | | Agent destination number |
| uch Agent Logon ID | | | | | Agent logon identifier |
| st Agent Attr | | | | | Agent attribute structure |
| st Last Logoff Cause | | | | | Last logoff reason |
| s State | | | | | Agent state |

Primers 1) 5'-CTGTTTGGAATTTGCAGGACTC-3' (SEQ ID NO:30)
2) 5'-CTCCTCTCTAAGCTTCTAACCACAGCTTGGAGGAGC-3' (SEQ ID NO:31)
3) 5'-CTCCTCTCTAAGCTTCTATGGGCTCAGACCACAGCTT-3' (SEQ ID NO:32)
4) 5'-CTCCTCTCTAAGCTTCTACTTGTCATCGTCGTCCTTGTA GTCACCACAGCTTGGAGGAGC-3' (SEQ ID NO:33)
5) 5'-CTCCTCTCTAAGCTTCTACTTGTCATCGTCGTCCTTGTAG TCTGGCTCAGACCACAGCTT-3' (SEQ ID NO:34)

TABLE 23

Agent Library
Agent Count Table

| Field | Value | Comments |
|---|---|---|
| us Total | | Total Agent Entries |
| us Disconnect | | Total Agents in Disconnect State |
| us Connect | | Total Agents in Connect State |
| us Ready | | Total Agents in Ready State |
| us Busy | | Total Agents in Busy State |

TABLE 4

| | | |
|---|---|---|
| 1) | GDNFR-α/gly-443/pBKRSV | hGDNFR-α terminating at glycine 443, followed by stop codon |
| 2) | GDNFR-α/pro-446/pBKRSV | hGDNFR-α terminating at proline 446, followed by stop codon |
| 3) | GDNF-α/gly-443/Flag/pBKRSV | hGDNFR-α terminating at glycine 443 with C-term Flag tag, followed by stop codon |
| 4) | GDNFR-α/pro-446/Flag/pBKRSV | hGDNFR-α terminating at proline 446 with C-term Flag tag, followed by stop codon |

TABLE 25

Agent Library
Group Table

| Field | | | | | Comments |
|---|---|---|---|---|---|
| st Group Data | Agent Group 1 | Agent Group 2 | ... | Agent Group n | Group information |
| h Assigned | | | | | Agents belonging to this group |
| h Prev Handle | | | | | Previous group handle |
| h Next Handle | | | | | Next group handle |
| ch Entry Used | | | | | Entry used flag |

TABLE 26

Agent Library
Calls Queued Per Group

| Field | | | | | Comments |
|---|---|---|---|---|---|
| uch Group Num | Agent Group 1 | Agent Group 2 | ... | Agent Group n | Group identifier |
| st Agent Count | | | | | Number of agents in this group |
| us Called Queued | | | | | Number of calls queued in this group |

TABLE 27

Agent Library
Control Assignment Table

| Field | Value | Comments |
|---|---|---|
| us Max Element | | Max element index in the table |
| us Use Element | | First element in the used list |
| us Free Element | | First element in the unused list |
| us Use Counts | | Element count |
| us Stand Alone | | Table is a standalone segment flag |

TABLE 28

Agent Library
Assignment Table

| Field | Agent Group 1 | Agent Group 2 | ... | Agent Group n | Comments |
|---|---|---|---|---|---|
| st Assign Data | | | | | Assignment data field |
| h Agent Prev Handle | | | | | Agents previous assignment |
| h Agent Next Handle | | | | | Agents next assignment |
| h Group Prev Handle | | | | | Group's previous assignment |
| h Group Next Handle | | | | | Group's next assignment |
| h Prev Handle | | | | | Previous assignment handle |

TABLE 28-continued

Agent Library
Assignment Table

| Field | Agent Group 1 | Agent Group 2 | ... | Agent Group n | Comments |
|---|---|---|---|---|---|
| h Next Handle | | | | | Next assignment handle |
| ch Entry Used | | | | | Entry used flag |

TABLE 29

Agent Library
Assignment Data Table

| Field | | | | | Comments |
|---|---|---|---|---|---|
| h Agent Handle | Agent Handle 1 | Agent Handle 2 | ... | Agent Handle n | Agent table handle |
| h Group Handle | | | | | Group table handle |

TABLE 30

Agent Library
Mapping Table

| Field | | | | | Comments |
|---|---|---|---|---|---|
| I Tid | Agent Tid 1 | Agent Tid 2 | ... | Agent Tid n | Terminal identifier |
| h Agent Handle | | | | | Agent table handle |
| ch Entry Used | | | | | Entry used flag |

TABLE 31

Agent Library
Fast Search for Agent Table

| Field | | | | | Comments |
|---|---|---|---|---|---|
| I Tid | Agent Tid 1 | Agent Tid 2 | ... | Agent Tid n | Agent terminal identifier |
| h Agent Handle | | | | | Agent table handle |

TABLE 32

Agent Library
Group Search Table

| Field | | | | | Comments |
|---|---|---|---|---|---|
| uchGroupNum | | | | | Group Number |
| h GroupHandle | Group Handle 1 | Group Handle 2 | ... | Group Handle n | Group Handle |

TABLE 33

Call Data Block Library
Call Data Block Table

| Field | | | | | Comments |
|---|---|---|---|---|---|
| I Cid | Call ID 1 | Call ID 2 | ... | Call ID n | Call identifier |
| st ANI | | | | | Calling number |
| st DN | | | | | Called number |
| st O Leg | Leg 1 | | | | Originating leg |
| st T Leg | | Leg 2 | | Leg n | Terminating leg |
| st TP | | | | | Time points |

Call Data Block APIs

| API | Function | Input | Output | Return |
|---|---|---|---|---|
| cdb_CreateCDBTable | Create and initialize a share memory segment for CDB table. Create and initialize a semaphore set to control the access. | usMaxNoOfCDBEntry -- maximum number of entries in CDB table | | CDB_SUCCESS or CDB_FAIL |
| cdb_DeteteCDBTable | Delete CDB share memory segment and its semaphore. | None | | CDB_SUCCESS or CDB_FAIL |
| cdb_AttachCDBTable | Attach to existing CDB table segment and its semaphore set. | None | | CDB_SUCCESS or CDB_FAIL |
| cdb_DetachCDBTable | Detach from the CDB share memory segment. | None | | CDB_SUCCESS or CDB_FAIL |
| cdb_CreateCDBEntry | Create a CDB table entry. | stCDBData -- CDB detail information plCid -- where the returned CID should be phCDBHandle -- where the returned CDBHandle should be(can be NULL) | plCid -- newly created CID phCDBHandle newly created handle | CDB_SUCCESS CDB_SHM_NOT_ATTACH CDB_TABLE_FULL CDB_LOCK_TABLE_ERR CDB_UNLOCK_TABLE_ERR |

-continued

Call Data Block APIs

| API | Function | Input | Output | Return |
|---|---|---|---|---|
| cdb_DeleteCDBEntry | Delete a CDB entry. | 1Cid - call ID | | CDB_SUCCESS<br>CDB_SHM_NOT_ATTACH<br>CDB_KEY_INVALID<br>CDB_LOCK_TABLE_ERR<br>CDB_UNLOCK_TABLE_ERR |
| cdb_SWPortToCid | Search CID by port identifiers. | stPort - which composed of span and channel ID<br>plCid - where the return CID should be saved | | CDB_SUCCESS<br>CDB_SHM_NOT_ATTACH<br>CDB_PORT_INVALID<br>CDB_LOCK_TABLE_ERR<br>CDB_UNLOCK_TABLE_ERR |
| cdb_GetCDBData | Get an CDB's detail data. | 1Cid -- Call ID<br>pstCDBData -- where return CDB data should be saved | pstCDBData -- CDB data | CDB_SUCCESS<br>CDB_SHM_NOT_ATTACH<br>CDB_KEY_INVALID<br>CDB_INPUT_ADDR_INVALID<br>CDB_LOCK_REC_ERR<br>CDB_UNLOCK_REC_ERR |
| cdb_SetCDBData | Set a CDB's detail data. | 1Cid -- Call ID<br>stCDBData -- CDB data | | CDB_SUCCESS<br>CDB_SHM_NOT_ATTACH<br>CDB_KEY_INVALID<br>CDB_LOCK_REC_ERR<br>CDB_UNLOCK_REC_ERR |
| cdb_PrintCDBData | Print CDB detail data. | stCDBData -- CDB data record<br>fp -- output file pointer | | None |
| cdb_GetCDBAttr | Returns attribute values | 1Cid - Call ID<br>each attribute specification is composed of three elements:<br>attribute constants, which are of following:<br>CDB_ATTR_ANI<br>CDB_ATTR_DN<br>CDB_ATTR_OLEG_PORT<br>CDB_ATTR_OLEG_STATE_MACHINE_ID<br>CDB_ATTR_OLEG_STATE<br>CDB_ATTR_OLEG_EVENT<br>CDB_ATTR_OLEG_CONF_PORT<br>CDB_ATTR_TLEG_PORT<br>CDB_ATTR_TLEG_STATE_MACHINE_ID<br>CDB_ATTR_TLEG_STATE<br>CDB_ATTR_TLEG_EVENT<br>CDB_ATTR_TLEG_CONF_PORT<br>CDB_ATTR_TP_1<br>CDB_ATTR_TP_4<br>CDB_ATTR_TP_5<br>CDB_ATTR_TP_6<br>CDB_ATTR_TP_7<br>attribute return value address<br>size of allocated attribute return value<br>Use CDB_ATTR_TERMINATOR as the last argument | Return attribute values and actual attribute size | CDB_SUCCESS<br>CDB_SHM_NOT_ATTACH<br>CDB_KEY_INVALID<br>CDB_INPUT_ADDR_INVALID<br>CDB_INPUT_SIZE_INVALID<br>CDB_ATTR_INVALID |

TABLE 9

| API | Function | Input | Output | Return |
|---|---|---|---|---|
| cdb_SetCDBAttr | Sets attribute values. | 1Cid -- Call ID<br>each attribute specification is composed of four elements:<br>attribute constants, which are the same as those provided above for function cdb_GetCDBAttr<br>* attribute modify mode:<br>CDB_ATTR_MODIFY_MODE_CLEAR<br>CDB_ATTR_MODIFY_MODE_INC<br>CDB_ATTR_MODIFY_MODE_DEC<br>CDB_ATTR_MODIFY_MODE_SET<br>attribute value address<br>size of attribute value<br>Use CDB_ATTR_TERMINATOR as the last argument. | | CDB_SUCCESS<br>CDB_SHM_NOT_ATTACH<br>CDB_KEY_INVALID<br>CDB_INPUT_ADDR_INVALID<br>CDB_ATTR_INVALID<br>CDB_ATTR_MODIFY_MODE_INVALID<br>CDB_LOCK_REC_ERR<br>CDB_UNLOCK_REC_ERR |
| cdb_GetCDBCount | Gets the number of CDB entries in the table. | pusCount -- where the count information should be saved | pusCount -- number of entries | CDB_SUCCESS<br>CDB_SHM_NOT_ATTACH<br>CDB_INPUT_ADDR_INVALID |
| cdb_PrintCDBTable | Print CDB table | fp -- output file pointer | | None |

TABLE 9-continued

| API | Function | Input | Output | Return |
|---|---|---|---|---|
| | summary and contents. | | | |
| cdb_PrintCDBEntry | Print content of one CDB table entry. | lCid -- Call ID<br>fp -- output file pointer | | CDB_SUCCESS<br>CDB_SHM_NOT_ATTACH<br>CDB_KEY_INVALID |

TABLE 34

Call Data Block Library
Leg Data Table

| Field | Leg 1 | Leg 2 | ... | Leg n | Comments |
|---|---|---|---|---|---|
| st Port | | | | | Switch port associated with leg. |
| us State Machine Id | | | | | State machine identifier. |
| us State | | | | | State of leg. |
| us Event | | | | | Event occurring on leg. |
| us Conf Port | | | | | Conference port. |

TABLE 35

Call Data Block Library
Port Table

| Field | | | | Comments |
|---|---|---|---|---|
| s Span ID | | | | Span identifier |
| s Channel ID | Channel 1 | Channel 2 | ... Channel n | Channel identifier |

TABLE 36

Call Data Block Library
Time Points

| Field | Call ID 1 | Call ID 2 | ... | Call ID n | Comments |
|---|---|---|---|---|---|
| ul TP1 | | | | | Time point 1 which is the time the switch controller detects an incoming call. |
| ul TP4 | | | | | Time point 4 which is the time a call is offered to an agent position. |
| ul TP5 | | | | | Time point 5 which is the time the agent port is done with a call. |
| ul TP6 | | | | | Time point 6 which is the time at which the switch controller detects answer supervision from the terminating end. |
| ul TP7 | | | | | Time point 7 which is the time at which controller detects reorigination DTMF sequence, originator disconnect, CSH timer expiration indicating terminator disconnect, or call park timer expiration (whichever occurs first). At time point 7, the switch controller may send time points to the billing system. |

TABLE 10

Service Logic Program Table APIs

| API | Function | Input | Output | Return |
|---|---|---|---|---|
| slp_CreateSLPTable | Create and initialize a share memory segment for SLP table. | usMaxNoOfSLPEntry -- maximum number of entries in SLP table | | SLP_SUCCESS or SLP_FAIL |
| slp_DeleteSLPTable | Delete SLP share memory segment. | None | | SLP_SUCCESS or SLP_FAIL |
| slp_AttachSLPTable | Attach to existing SLP table segment. | None | | SLP_SUCCESS or SLP_FAIL |
| slp_DetachSLPTable | Detach from the SLP share memory segment. | None | | SLP_SUCCESS or SLP_FAIL |
| slp_CreateSLPEntry | Create a SLP table entry. | stSLPData -- SLP detail information<br>pbSLPHandle -- where the returned SLPHandle should be (can be NULL) | phSLPHandle -- newly created handle | SLP_SUCCESS<br>SLP_SHM_NOT_ATTACH<br>SLP_TABLE_FULL |
| slp_DeleteSLPEntry | Delete a SLP entry. | lCid -- Call ID | | SLP_SUCCESS<br>SLP_SHM_NOT_ATTACH<br>SLP_KEY_INVALID |
| slp_GetSLPData | Get an SLP's detail data. | lCid -- Call ID<br>pstSLPData -- where return SLP data should be saved | pstSLPData -- SLP data | SLP_SUCCESS<br>SLP_SHM_NOT_ATTACH<br>SLP_KEY_INVALID |

TABLE 10-continued

Service Logic Program Table APIs

| API | Function | Input | Output | Return |
|---|---|---|---|---|
| slp_SetSLPData | Set an SLP's detail data. | 1Cid -- Call ID<br>stSLPData -- SLP data | | SLP_INPUT_ADDR_INVALID<br>SLP_SUCCESS<br>SLP_SHM_NOT_ATTACH<br>SLP_KEY_INVALID |
| slp_PrintSLPData | Print SLP detail data. | stSLPData -- SLP data record<br>fp -- output file pointer | | None |
| slp_GetSLPAttr | Returns attribute values. | 1Cid -- Call ID<br>each attribute specification is<br>composed of three elements: attribute<br>constants, which are of followings:<br>SLP_ATTR_FEATURE<br>SLP_ATTR_FEATURE_STATE<br>SLP_ATTR_LEG_FEATURE<br>SLP_ATTR_EXPECTED_EVENT<br>SLP_ATTR_RELATE_CID_1<br>SLP_ATTR_RELATE_CID_2<br>SLP_ATTR_RELATE_CID_3<br>SLP_ATTR_RELATE_CID_4<br>SLP_ATTR_RELATE_CID_5<br>SLP_ATTR_RELATE_CID_6<br>SLP_ATTR_RELATE_CID_7<br>SLP_ATTR_RELATE_CID_8<br>SLP_ATTR_RELATE_CID_9<br>attribute return value address<br>size of allocated attribute return value<br>Use SLP_ATTR_TERMINATOR<br>as the last argument | Return attribute<br>values and actual<br>attribute size | SLP_SUCCESS<br>SLP_SHM_NOT_ATTACH<br>SLP_KEY_INVALID<br>SLP_INPUT_ADDR_INVALID<br>SLP_INPUT_SIZE_INVALID<br>SLP_ATTR_INVALID |
| slp_SetSLPAttr | Sets attribute values. | 1Cid -- Call ID<br>each attribute specification is<br>composed of four elements: attribute<br>constants, which are of followings:<br>SLP_ATTR_MODIFY_MODE_CLEAR<br>SLP_ATTR_MODIFY_MODE_INC<br>SLP_ATTR_MODIFY_MODE_DEC<br>SLP_ATTR_MODIFY_MODE_SET<br>attribute value address<br>size of attribute value<br>Use SLP_ATTR_TERMINATOR<br>as the last argument | | SLP_SUCCESS<br>SLP_SHM_NOT_ATTACH<br>SLP_KEY_INVALID<br>SLP_INPUT_ADDR_INVALID<br>SLP_ATTR_INVALID |
| slp_GetCidByTid | Search CID by TID. | 1Tid -- TID of agent<br>pICid -- where return CID should be saved | | SLP_SUCCESS<br>SLP_SHM_NOT_ATTACH<br>SLP_INPUT_ADDR_INVALID<br>SLP_TID_INVALID |
| slp_GetSLPCount | Gets the number of SLP entries in the table. | pusCount -- where the count information should be saved | pusCount --<br>number of entries | SLP_SUCCESS<br>SLP_SHM_NOT_ATTACH<br>SLP_INPUT_ADDR_INVALID |
| slp_PrintSLPTable | Print SLP table summary and contents. | fp -- output file pointer | | None |
| slp_PrintSLPEntry | Print content of one SLP table entry. | 1Cid -- Call ID<br>fp -- output file pointer | | SLP_SUCCESS<br>SLP_SHM_NOT_ATTACH<br>SLP_KEY_INVALID |

TABLE 37

Service Logic Program Library
Service Logic Program Table

| Field | Comments |
|---|---|
| 1 Cid | Call identifier |
| 1 Tid | Agent terminal identifier |
| s Feature | Feature of the call |
| s Feature State | State of the feature |
| s Leg Feature | Feature of the leg |
| s Expected Event | Expected event |
| 1 Relate Cid 1 | Related Call ID 1 |
| 1 Relate Cid 2 | Related Call ID 2 |
| 1 Relate Cid 3 | Related Call ID 3 |
| 1 Relate Cid 4 | Related Call ID 4 |
| 1 Relate Cid 5 | Related Call ID 5 |
| 1 Relate Cid 6 | Related Call ID 6 |
| 1 Relate Cid 7 | Related Call ID 7 |
| 1 Relate Cid 8 | Related Call ID 8 |
| 1 Relate Cid 9 | Related Call ID 9 |

TABLE 11

Switch APIs

| API | Function | Input | Return |
|---|---|---|---|
| SW_CreateSWSegment | Create share memory segment for switch resource tables, organize and initialize individual tables and create semaphores for them. Caller: PROC_MAN. | stSWSize -- define the maximum number of entries for node table, conference table, span table and trunk group tables | SW_SUCCESS SW_FAIL |
| SW_DeleteSWSegment | Delete share memory segment for switch resource tables, remove semaphores. Caller: PROC_MAN. | None | SW_SUCCESS SW_FAIL |
| SW_AttachSWSegment | Attach to switch resource table share memory segment and semaphores. | None | SW_SUCCESS SW_FAIL |
| SW_DetachSWSegment | Detach from switch resource table share memory. | | SW_SUCCESS SW_FAIL |
| SW_AddNode | Add a node entry into switch node table. | stNode -- contains node information, such as logical node ID, node serial number etc. | SW_SUCCESS SW_SHM_NOT_ATTACH SW_NODE_ID_INVALID SW_NODE_ID_INUSE |
| SW_RemoveNode | Remove an existing node from switch node table. | usNodeID -- logical node ID | SW_SUCCESS SW_SHM_NOT_ATTACH SW_NODE_ID_INVALID |
| SW_GetNodeID | Get logical node ID by switch node serial number. | lPhysicalID -- switch node serial number pusNodeID -- where to deposit the logical node ID | Output: pusNodeID -- logical node ID if function returns SW_SUCCESS Return: SW_SHM_NOT_ATTACH SW_SUCCESS SW_KEY_INVALID SW_INPUT_ADDR_INVALID |
| SW_GetNodeData | Get node information. | usNodeID -- logical node ID pstNodeData -- where to deposit node information | SW_SUCCESS SW_SHM_NOT_ATTACH SW_NODE_ID_INVALID SW_INPUT_ADDR_INVALID |
| SW_SetNodeData | Set node information. | usNodeID -- logical node ID stNodeData -- node data | SW_SUCCESS SW_SHM_NOT_ATTACH SW_NODE_ID_INVALID |
| SW_PrintNodeData | Print node data to file. | fp -- file pointer stNodeData -- node data | None |
| SW_GetNodeAttr | Get attribute(field) values of the specified node. | usNodeID -- logical node ID every attribute specification is composed of three elements: attribute constant - specify which attribute, can be: SW_NODE_ATTR_PHYSICAL_ID SW_NODE_ATTR_HOST_NODE_ID SW_NODE_ATTR_SW_TYPE SW_NODE_ATTR_MAX_SLOT SW_NODE_ATTR_STATUS SW_NODE_ATTR_TERMINATOR (to terminate the argument list) | SW_SUCCESS SW_SHM_NOT_ATTACH SW_NODE_ID_INVALID SW_ATTR_INVALID SW_INPUT_ADDR_INVALID SW_INPUT_SIZE_INVALID |

TABLE 11-continued

Switch APIs

| API | Function | Input | Return |
|---|---|---|---|
| SW_SetNodeAttr | Change attribute values of the specified node. | attribute value pointer - where to deposit the attribute value<br>attribute size pointer - the size caller allocated, after function call, the value is the actual size of the attribute value<br>Note: This is a variable length argument function, use SW_NODE_ATTR_TERMINATOR as the last argument.<br>Similar as SW_GetNodeAttr(...) | SW_SUCCESS<br>SW_SHM_NOT_ATTACH<br>SW_NODE_ID_INVALID<br>SW_ATTR_INVALID<br>SW_INPUT_ADDR_INVALID<br>SW_INPUT_SIZE_INVALID |
| SW_GetNodeCount | Get number of existing switch nodes in the system. | pusCount -- where to deposit the number of nodes | SW_SUCCESS<br>SW_SHM_NOT_ATTACH<br>SW_INPUT_ADDR_INVALID |
| SW_PrintNodeTable | Print node table summary. | fp - file pointer of the output file | None |
| SW_PrintNodeEntry | Print one node data to an output file (or standard output). | fp - file pointer<br>usNodeID - logical node ID | SW_SUCCESS<br>SW_SHM_NOT_ATTACH<br>SW_NODE_ID_INVALID |
| SW_GetSlotMap | Get slot map (slot to card mapping) of specified node. | usNodeID -- logical node ID<br>pusSlotMax - number of slots caller allocates<br>pstSlots - where to deposit slot map | Output: pusSlotMax - actual maximum number of slots on that switch node<br>Return:<br>SW_SUCCESS<br>SW_SHM_NOT_ATTACH<br>SW_INPUT_ADDR_INVALID<br>SW_NODE_ID_INVALID |
| SW_PrintSlotMap | Print slot map to a file or standard output. | fp -- file pointer<br>usSlotMax -- number of slots<br>pstSlots -- slot map information | None |
| SW_AddCard | Add a card to a node. | usNodeID -- logical node ID<br>usSlotNo -- slot number of the card<br>eCardType -- card type<br>pvCard -- detail card structure, varies depends on card type | SW_SUCCESS<br>SW_SHM_NOT_ATTACH<br>SW_NODE_ID_INVALID<br>SW_SLOT_NO_INVALID<br>SW_SLOT_NO_INUSE<br>SW_TABLE_FULL<br>SW_CARD_TYPE_INVALID<br>SW_INPUT_ADDR_INVALID |
| SW_RemoveCard | Remove a card from the node. | usNodeID -- logical node ID<br>usSlotNo -- slot number of the card | SW_SUCCESS<br>SW_SHM_NOT_ATTACH<br>SW_NODE_ID_INVALID<br>SW_SLOT_NO_INVALID |
| SW_GetCard | Get card structure (information). | usNodeID -- logical node ID<br>usSlotNo -- slot number<br>peCardType -- return card type<br>pvCard -- return detail card structure | SW_SUCCESS<br>SW_SHM_NOT_ATTACH<br>SW_NODE_ID_INVALID<br>SW_SLOT_NO_INVALID<br>SW_INPUT_ADDR_INVALID |

TABLE 11-continued

Switch APIs

| API | Function | Input | Return |
|---|---|---|---|
| | | | Note: declare a CardUnion variable, if card type is not known to the caller. Use the pointer to that CardUnion as pvCard argument |
| SW_GetCardSlot | Get slot no of a card by its serial number. | sSerialNumber -- card serial number<br>pusNodeID -- return logical node ID<br>pustSlotNo -- return slot no of the card | SW_SUCCESS<br>SW_SHM_NOT_ATTACH<br>SW_KEY_INVALID<br>SW_INPUT_ADDR_INVALID |
| SW_GetCardAttr | Get attribute values of card. | pstSlotData -- return general card information<br>usNodeID -- node ID<br>usSlotNo -- slot no<br>sAttr -- attribute constant<br>pvAttrVal -- attribute value | SW_SUCCESS<br>SW_SHM_NOT_ATTACH<br>SW_NODE_ID_INVALID<br>SW_SLOT_NO_INVALID<br>SW_ATTR_INVALID<br>SW_INPUT_ADDR_INVALID<br>SW_CARD_TYPE_INVALID |
| SW_SetCardAttr | Set attribute value of a card. | usNodeID -- node ID<br>usSlotNo -- slot no<br>sAttr -- attribute constant<br>pvAttrVal -- attribute value | SW_SUCCESS<br>SW_SHM_NOT_ATTACH<br>SW_NODE_ID_INVALID<br>SW_SLOT_NO_INVALID<br>SW_ATTR_INVALID<br>SW_INPUT_ADDR_INVALID<br>SW_CARD_TYPE_INVALID |
| SW_AddStack | Add a SS7 stack. | usNodeID -- logical node ID<br>usSlotNo -- slot no of the SS7 card<br>stStack -- stack info | SW_SUCCESS<br>SW_NODE_ID_INVALID<br>SW_SLOT_NO_INVALID<br>SW_CARD_TYPE_INVALID<br>SW_STACK_ID_INVALID<br>SW_STACK_ID_INUSE |
| SW_RemoveStack | Remove a SS7 stack. | usNodeID -- logical node ID<br>usSlotNo -- slot no of the SS7 card<br>usStackID -- stack ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_STACK_ID_INVALID |
| SW_AddLinkSet | Add a SS7 linkset. | usNodeID -- logical node ID<br>usSlotNo -- slot no of the SS7 card<br>stLinkeSet -- linkset info. | SW_SUCCESS<br>SW_SHM_NOT_ATTACH<br>SW_NODE_ID_INVALID<br>SW_SLOT_NO_INVALID<br>SW_CARD_TYPE_INVALID<br>SW_LINKSET_ID_INVALID<br>SW_LINKSET_ID_INUSE |
| SW_RemoveLinkSet | Remove a SS7 linkeset. | usNodeID -- logical node ID<br>usSlotNo -- slot no of the SS7 card<br>stLinksetID -- linkset ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_LINKSET_ID_INVALID |
| SW_AddLink | Add a link. | usNodeID -- logical node ID<br>usSlotNo -- slot no of the SS7 card | SW_SUCCESS<br>SW_SHM_NOT_ATTACH |

TABLE 11-continued

Switch APIs

| API | Function | Input | Return |
|---|---|---|---|
| | | stLink - link info. | SW_NODE_ID_INVALID<br>SW_SLOT_NO_INVALID<br>SW_CARD_TYPE_INVALID<br>SW_LINK_ID_INVALID<br>SW_LINK_ID_INUSE |
| SW_RemoveLink | Remove a link. | usNodeID -- logical node ID<br>usSlotNo -- slot no of the SS7 card<br>usLinkID -- link ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_LINK_ID_INVALID |
| SW_GetLink | Get SS7 link ID of a specified channel. | usSpanID -- logical span ID<br>usChannelID -- channel ID<br>pusNodeID - return logical node ID<br>pusSlotNo - return slot no<br>pusLinkID - return SS7 link ID | SW_SUCCESS<br>SW_SHM_NOT_ATTACH<br>SW_INPUT_ADDR_INVALID<br>SW_KEY_INVALID |
| SW_RemoveLink2 | Remove a SS7 link. | usSpanID -- logical span ID<br>usChannelID -- channel ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_LINK_ID_INVALID |
| SW_AddDest | Add SS7 destination. | usNodeID -- logical node ID<br>usSlotID -- slot no of the SS7 card<br>stDest -- destination info. | SW_SUCCESS<br>SW_SHM_NOT_ATTACH<br>SW_NODE_ID_INVALID<br>SW_SLOT_NO_INVALID<br>SW_CARD_TYPE_INVALID<br>SW_DEST_ID_INVALID<br>SW_DEST_ID_INUSE |
| SW_RemoveDest | Remove a destination. | usNodeID -- logical node ID<br>usSlotNo -- slot no of the SS7 card<br>usDestID -- destination ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_DEST_ID_INVALID |
| SW_GetDest | Get destination ID of a specified DPC. | usNodeID -- logical node ID<br>usSlotNo -- slot no of the SS7 card<br>ulDPC -- destination point code<br>pustDestID -- return destination ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_KEY_INVALID<br>SW_INPUT_ADDR_INVALID |
| SW_RemoveDest2 | Remove destination. | usNodeID -- logical node ID<br>usSlotNo -- slot no of the SS7 card<br>ulDPC -- destination point code | SW_SUCCESS<br>SW_SHM_NOT_ATTACH<br>SW_NODE_ID_INVALID<br>SW_SLOT_NO_INVALID<br>SW_CARD_TYPE_INVALID<br>SW_DEST_ID_INVALID |
| SW_AddRoute | Add a SS7 route. | usNodeID - logical node ID | SW_SUCCESS |

TABLE 11-continued

Switch APIs

| API | Function | Input | Return |
|---|---|---|---|
| SW_RemoveRoute | Remove a SS7 route. | usSlotNo - slot no of the SS7 card<br>stRoute - route info. | SW_SHM_NOT_ATTACH<br>SW_NODE_ID_INVALID<br>SW_SLOT_NO_INVALID<br>SW_CARD_TYPE_INVALID<br>SW_ROUTE_ID_INVALID<br>SW_ROUTE_ID_INUSE<br>SW_SUCCESS |
| SW_AddSimm | Add a simm to a MFDSP card. | usNodeID -- logical node ID<br>usSlotNo -- slot no of the SS7 card<br>usRouteID -- route ID | SW_SHM_NOT_ATTACH<br>SW_NODE_ID_INVALID<br>SW_SLOT_NO_INVALID<br>SW_CARD_TYPE_INVALID<br>SW_ROUTE_ID_INVALID<br>SW_SUCCESS |
| SW_RemoveSimm | Remove a simm from a MFDSP card. | usNodeID - logical node ID<br>usSlotNo - slot no of the card<br>stSimm - simm information | SW_SHM_NOT_ATTACH<br>SW_NODE_ID_INVALID<br>SW_SLOT_NO_INVALID<br>SW_CARD_TYPE_INVALID<br>SW_SIMM_ID_INVALID<br>SW_SUCCESS |
| SW_GetDSPResourceInfo | Get the maximum DSP resource information. | usNodeID - logical node ID<br>usSlotNo - slot no of the card<br>usSimmID - simm ID | SW_SHM_NOT_ATTACH<br>SW_NODE_ID_INVALID<br>SW_SLOT_NO_INVALID<br>SW_CARD_TYPE_INVALID<br>SW_SIMM_ID_INVALID<br>SW_SUCCESS |
| SW_GetDChannelID | Get an ISDN D Channel ID. | pusDSPResource - where to deposit the DSP resource information | SW_SHM_NOT_ATTACH<br>SW_INPUT_ADDR_INVALID<br>SW_SUCCESS |
| SW_AssignDChannel | Assign an ISDN D Channel. | usSpanID - logical span ID<br>usChannelID -- channel ID<br>pusNodeID -- return logical node ID<br>pusSlotNo -- return slot no<br>pusDChannelID -- D Channel ID | SW_SHM_NOT_ATTACH<br>SW_INPUT_ADDR_INVALID<br>SW_DCHANNEL_INVALID<br>SW_SUCCESS |
| SW_DeassignDChannel | Remove an ISDN D Channel. | usNodeID - logical node ID<br>usSlotNo - slot no of the card<br>stDChannel - D Channel info. | SW_SHM_NOT_ATTACH<br>SW_NODE_ID_INVALID<br>SW_SLOT_NO_INVALID<br>SW_CARD_TYPE_INVALID<br>SW_DCHANNEL_INUSE<br>SW_TABLE_FULL<br>SW_SUCCESS |
| SW_AddDChannel | Add a facility to a ISDN channel. | usSpanID - logical span ID<br>usChannelID -- channel ID | SW_SHM_NOT_ATTACH<br>SW_NODE_ID_INVALID<br>SW_SLOT_NO_INVALID<br>SW_CARD_TYPE_INVALID<br>SW_DCHANNEL_INVALID<br>SW_SUCCESS |
| | | usSpanID - D Channel span ID<br>usChannelID - D Channel Channel ID | SW_SHM_NOT_ATTACH |

TABLE 11-continued

Switch APIs

| API | Function | Input | Return |
|---|---|---|---|
| | | usFacSpanID - logical span ID to be added to the D Channel | SW_NODE_ID_INVALID<br>SW_SLOT_NO_INVALID<br>SW_CARD_TYPE_INVALID<br>SW_DCHANNEL_INVALID<br>SW_TABLE_FULL |
| SW_RemoveDChannelFacility | Remove a facility from an ISDN D Channel. | usFacSpanID -- span ID to be removed from the D Channel | SW_SUCCESS<br>SW_SHM_NOT_ATTACH<br>SW_NODE_ID_INVALID<br>SW_SLOT_NO_INVALID<br>SW_CARD_TYPE_INVALID<br>SW_DCHANNEL_INVALID<br>SW_FACILITY_INVALID |
| SW_PrintCPUCard | Print a CPU card info. | File *fp, CPUCard stCPUCard | |
| SW_PrintLineCard | Print a line card info. | File *fp, LineCard stCard | |
| SW_PrintMFDSPCard | Print MFDSP card info. | File *fp, MFDSPCard stCard | |
| SW_PrintSS7Card | Print SS7 card info. | File *fp, SS7Card stCard | |
| SW_PrintEXNETCard | Print EXNET card info. | File *fp, EXNETCard stCard | |
| SW_PRINTISDNCard | Print ISDN Card info. | File *fp, ISDNCard st Card | |
| SW_PRINTOtherCard | Print other type of card information. | File *fp, OtherCard stCard | |
| SW_CreateConf | Add a conference to conference table. | stConfData -- conference info. | |
| SW_DeleteConf | Delete a conference. | usConfID -- conference ID | SW_SUCCESS<br>SW_SHM_NOT_ATTACH<br>SW_LOCK_TABLE_ERR<br>SW_UNLOCK_TABLE_ERR<br>SW_TABLE_FULL |
| SW_ReserveConf | Reserve a conference. | stInput -- conference type and size in need<br>pstOutPut -- return conference info. | SW_SUCCESS<br>SW_SHM_NOT_ATTACH<br>SW_LOCK_TABLE_ERR<br>SW_UNLOCK_TABLE_ERR<br>SW_CONF_ID_INVALID |
| SW_ReleaseConf | Release a previously reserved conference. | usConfID - conference ID | SW_SUCCESS<br>SW_SHM_NOT_ATTACH<br>SW_LOCK_TABLE_ERR<br>SW_UNLOCK_TABLE_ERR<br>SW_NO_CONF_AVAILABLE |
| SW_GetConfData | Get conference data. | usConfID -- conference ID<br>pstConfData -- return conference data | SW_SUCCESS<br>SW_SHM_NOT_ATTACH<br>SW_LOCK_TABLE_ERR<br>SW_UNLOCK_TABLE_ERR<br>SW_CONF_ID_INVALID |
| SW_SetConfData | Change conference data. | usConfID -- conference ID<br>stConfData-- conference data | SW_SUCCESS<br>SW_SHM_NOT_ATTACH<br>SW_INPUT_ADDR_INVALID<br>SW_LOCK_TABLE_ERR |

TABLE 11-continued

Switch APIs

| API | Function | Input | Return |
|---|---|---|---|
| SW_PrintConfData | Print conference data. | fp -- output file pointer<br>stConfData -- conference data | SW_UNLOCK_TABLE_ERR<br>SW_CONF_ID_INVALID |
| SW_GetConfCount | Get total number of conferences in the conference table. | pusCount - where to deposit number of conference | None |
| SW_PrintConfTable | Print conference table summary. | fp -- output file pointer | SW_SUCCESS<br>SW_SHM_NOT_ATTACH<br>SW_INPUT_ADDR_INVALID |
| SW_PrintConfEntry | Print one conference entry. | fp -- output file pointer<br>usConfID -- conference ID | None<br>SW_SUCCESS<br>SW_SHM_NOT_ATTACH<br>SW_CONF_ID_INVALID |
| SW_PrintConfSearchTable | Print conference search table content. | fp -- output file pointer | None |
| SW_AssignLogicalSpan | Assign logical span. | usNodeID - logical node ID<br>usSlotNo -- slot no of the line card<br>usPhySpanID - physical span ID on the line card<br>usLogSpanID -- assigned logical span ID | SW_SUCCESS<br>SW_SHM_NOT_ATTACH<br>SW_NODE_ID_INVALID<br>SW_SLOT_NO_INVALID<br>SW_CARD_TYPE_INVALID<br>SW_SPAN_ID_INVALID<br>SW_LOCK_TABLE_ERR<br>SW_UNLOCK_TABLE_ERR |
| SW_DeassignLogSpan | De-assign one logical span. | usLogSpanID - logical span ID | SW_SUCCESS<br>SW_SHM_NOT_ATTACH<br>SW_SPAN_ID_INVALID<br>SW_LOCK_TABLE_ERR<br>SW_UNLOCK_TABLE_ERR |
| SW_DeassignCardLogSpan | De-assign all the logical spans on one Line card. | usNodeID -- logical node ID<br>usSlotNo - slot no of the card | SW_SUCCESS<br>SW_NODE_ID_INVALID<br>SW_SLOT_NO_INVALID<br>SW_LOCK_TABLE_ERR<br>SW_UNLOCK_TABLE_ERR |
| SW_DeassignNodeLogSpan | De-assign all the logical spans on one node. | usNodeID -- logical node ID | SW_SUCCESS<br>SW_SHM_NOT_ATTACH<br>SW_NODE_ID_INVALID<br>SW_LOCK_TABLE_ERR<br>SW_UNLOCK_TABLE_ERR |
| SW_DeassignAllLogSpan | De-assign all the logical spans. | None | SW_SUCCESS<br>SW_SHM_NOT_ATTACH<br>SW_LOCK_TABLE_ERR<br>SW_UNLOCK_TABLE_ERR |
| SW_SpanInService | Bring one span in service (change span state). | usSpanID -- logical span ID | SW_SUCCESS<br>SW_SHM_NOT_ATTACH<br>SW_SPAN_ID_INVALID |
| SW_SpanOutService | Bring one span out of service. | usSpanID - logical span ID | SW_SUCCESS<br>SW_SHM_NOT_ATTACH<br>SW_SPAN_ID_INVALID |
| SW_ChannelsInService | Bring a range of channels in service. | usStartSpanID -- starting logical span ID<br>usStartChannelID -- starting channel ID<br>usEndSpanID -- ending logical span ID | SW_SUCCESS<br>SW_SHM_NOT_ATTACH<br>SW_SPAN_ID_INVALID |

TABLE 11-continued

Switch APIs

| API | Function | Input | Return |
|---|---|---|---|
| SW_ChannelsOutService | Bring a range of channels out of service. | usEndChannelID - ending logical channel ID<br>usStartSpanID -- starting logical span ID<br>usStartChannelID - starting channel ID<br>usEndSpanID - ending logical span ID<br>usEndChannelID - ending logical channel ID | SW_SUCCESS<br>SW_SHM_NOT_ATTACH<br>SW_SPAN_ID_INVALID |
| SW_AddSS7CIC | Assign SS7 CIC to channel. | usSpanID - logical span ID<br>usChannelID - base channel ID<br>ulDPC -- Destination Point Code<br>ulCIC -- base CIC<br>usTotal -- total number of channels to be assigned<br>Note: all channels should be on the same span for CIC assignment | SW_SUCCESS<br>SW_SHM_NOT_ATTACH<br>SW_SPAN_ID_INVALID<br>SW_LOCK_TABLE_ERR<br>SW_UNLOCK_TABLE_ERR |
| SW_RemoveSS7CIC | De-assign SS7 CIC. | usSpanID - logical span ID<br>usChannelID - channel ID<br>usTotal -- total number of channels de-assign CIC | SW_SUCCESS<br>SW_SHM_NOT_ATTACH<br>SW_SPAN_ID_INVALID<br>SW_LOCK_TABLE_ERR<br>SW_UNLOCK_TABLE_ERR |
| SW_GetSS7Channel | Get channel information by SS7 DPC and CIC. | ulDPC -- Destination Point Code<br>usCIC - Circuit Identification Code<br>pusSpanID -- return logical span ID<br>pusChannelID - return channel ID | SW_SUCCESS<br>SW_SHM_NOT_ATTACH<br>SW_KEY_INVALID<br>SW_LOCK_TABLE_ERR<br>SW_UNLOCK_TABLE_ERR |
| SW_GetSpan | Get a span structure. | usSpanID - logical span ID | SW_SUCCESS<br>SW_SHM_NOT_ATTACH<br>SW_SPAN_ID_INVALID<br>SW_LOCK_REC_ERR<br>SW_UNLOCK_REC_ERR |
| SW_SetSpan | Set a span structure. | usSpanID - logical span ID | SW_SUCCESS<br>SW_SHM_NOT_ATTACH<br>SW_SPAN_ID_INVALID<br>SW_LOCK_REC_ERR<br>SW_UNLOCK_REC_ERR |
| SW_GetChannel | Get a channel structure. | usSpanID -- logical span ID<br>usChannelID - channel ID<br>pstChannel where to deposit Channel info. | SW_SUCCESS<br>SW_SHM_NOT_ATTACH<br>SW_INPUT_ADDR_INVALID<br>SW_SPAN_ID_INVALID<br>SW_CHANNEL_ID_INVALID<br>SW_LOCK_REC_ERR<br>SW_UNLOCK_REC_ERR |
| SW_SetChannel | Set a channel structure. | usSpanID -- logical span ID<br>usChannelID -- channel ID<br>stChannel -- channel info | SW_SUCCESS<br>SW_SHM_NOT_ATTACH<br>SW_SPAN_ID_INVALID<br>SW_CHANNEL_ID_INVALID<br>SW_LOCK_REC_ERR<br>SW_UNLOCK_REC_ERR |
| SW_PrintSpanTable | Print span table summary. | fp -- output file pointer | None |
| SW_PrintSpanEntry | Print one span info. | fp -- output file pointer | SW_SUCCESS<br>SW_SHM_NOT_ATTACH |

TABLE 11-continued

Switch APIs

| API | Function | Input | Return |
|---|---|---|---|
| SW_AddTrunkGroup | Add one trunk group. | stTrunkGroup -- trunk group info. | SW_SPAN_ID_INVALID<br>SW_SUCCESS<br>SW_SHM_NOT_ATTACH<br>SW_TABLE_FULL<br>SW_LOCK_TABLE_ERR<br>SW_UNLOCK_TABLE_ERR |
| SW_RemoveTrunkGroup | Remove a trunk group. | puchTrunkGroupID -- trunk group ID | SW_SUCCESS<br>SW_SHM_NOT_ATTACH<br>SW_TRUNK_GROUP_ID_INVALID<br>SW_DEL_SEARCH_ENTRY_ERR<br>SW_LOCK_TABLE_ERR<br>SW_UNLOCK_TABLE_ERR |
| SW_GetTrunkGroup | Get trunk group info. | puchTrunkGroupID - trunk group ID<br>pstTrunkGroup -- return trunk group structure | SW_SUCCESS<br>SW_SHM_NOT_ATTACH<br>SW_TRUNK_GROUP_ID_INVALID<br>SW_INPUT_ADDR_INVALID<br>SW_LOCK_TABLE_ERR<br>SW_UNLOCK_TABLE_ERR |
| SW_SetTrunkGroup | Change trunk group info. | puchTrunkGroupID -- trunk group ID<br>stTrunkGroup - trunk group information | SW_SUCCESS<br>SW_SHM_NOT_ATTACH<br>SW_TRUNK_GROUP_ID_INVALID<br>SW_INPUT_ADDR_INVALID<br>SW_LOCK_TABLE_ERR<br>SW_UNLOCK_TABLE_EPR |
| SW_GetTrunkGroupCount | Get total number of trunk groups in trunk group table. | *pusCount | SW_SUCCESS<br>SW_SHM_NOT_ATTACH<br>SW_INPUT_ADDR_INVALID |
| SW_AddChannelsToTrunkGroup | Add a range of channels to one trunk group. | puchTrunkGroupID -- trunk group ID<br>usStartSpanID - starting logical span ID<br>usStartChannelID - starting channel ID<br>usEndSpanID - ending logical span ID<br>usEndChannelID - ending channel ID<br>Note: start → in ascending order | SW_SUCCESS<br>SW_SHM_NOT_ATTACH<br>SW_TRUNK_GROUP_ID_INVALID<br>SW_SPAN_ID_INVALID<br>SW_INPUT_ADDR_INVALID<br>SW_LOCK_TABLE_ERR<br>SW_UNLOCK_TABLE_ERR |
| SW_RemoveChannelsFromTrunkGroup | De-assign a range of channels from their trunk groups. | usStartSpanID -- starting logical span ID<br>usStartChannelID - starting channel ID<br>usEndSpanID - ending logical span ID<br>usEndChannelID -- ending channel ID<br>Note: start → end in ascending order | SW_SUCCESS<br>SW_SHM_NOT_ATTACH<br>SW_SPAN_ID_INVALID<br>SW_INPUT_ADDR_INVALID<br>SW_LOCK_TABLE_ERR<br>SW_UNLOCK_TABLE_ERR |

TABLE 11-continued

Switch APIs

| API | Function | Input | Return |
|---|---|---|---|
| SW_ChannelSelect | Select an available channel from a trunk group and reserve it. | puchTrunkGroupID - trunk group ID<br>usSelectMode -- channel select mode, can be one of the following values:<br>SW_CHANNEL_SELECT_MOST_IDLE<br>SW_CHANNEL_SELECT_ASCENDING<br>SW_CHANNEL_SELECT_DESCENDING<br>pusSpanID -- return logical span ID<br>pusChannelID -- return channel ID | SW_SUCCESS<br>SW_SHM_NOT_ATTACH<br>SW_TRUNK_GROUP_ID_INVALID<br>SW_INPUT_ADDR_INVALID<br>SW_LOCK_TABLE_ERR<br>SW_UNLOCK_TABLE_ERR |
| SW_ChannelRelease | Release a channel. | usSpanID -- logical span ID<br>usChannelID -- channel ID | SW_SUCCESS<br>SW_SHM_NOT_ATTACH<br>SW_SPAN_ID_INVALID<br>SW_CHANNEL_ID_INVALID<br>SW_LOCK_TABLE_ERR<br>SW_UNLOCK_TABLE_ERR |
| SW_PrintTrunkGroupTable | Print trunk group table summary. | fp -- output file pointer | None |
| SW_PrintTrunkGroupEntry | Print one trunk group entry. | fp -- output file pointer<br>puchTrunkGroupID -- trunk group ID | SW_SUCCESS<br>SW_SHM_NOT_ATTACH<br>SW_INPUT_ADDR_INVALID<br>SW_TRUNK_GROUP_ID_INVALID<br>SW_LOCK_TABLE_ERR<br>SW_UNLOCK_TABLE_ERR |
| SW_PrintTrunkGroupSearchTable | Print trunk group search table. | fp -- output file pointer | None |

TABLE 38

**Switch Library
Node Information Table**

| Field | | | | Comments |
|---|---|---|---|---|
| us Node ID | Node 1 | Node 2 | ... Node 3 | Logical node identifier for the switch. |
| 1Physical ID | | | | Node serial number. |
| US Host Node ID | | | | Host node logical identifier |
| S SWType | | | | Switch system type (LNX, CSN) |
| US MaxSlot | | | | Maximum number of slots. |
| sStatus | | | | Status of the node. |

TABLE 39

**Switch Library
Card Information Table**

| Field | | | | Comments |
|---|---|---|---|---|
| usSlotNo | | | | stat number |
| eCard Type | | | | card type |
| Sserial Number | Card Serial No. 1 | Card Serial No. 2 | ... Card Serial No. 3 | card serial number |
| eCardStatus | | | | status of the card |
| sConfigTag | | | | configure tag if any |
| sCardRole | | | | primary, secondary etc. |
| usMatchSlot | | | | matching front or rear slot |

TABLE 40

**Switch Controller
Slot Table**

| Field | Slot 1 | Slot 2 | ... Slot n | Comments |
|---|---|---|---|---|
| stCardInfo | | | | generic card info |
| pvCard | | | | specific card info |
| ulCardEntrySize | | | | card entry size |
| chEntryUsed | | | | entry used flag |

TABLE 41

**Switch Library
Node Table Type**

| Field | Node 1 | Node 2 | .. Node 3 | Comments |
|---|---|---|---|---|
| stNodeData | | | | node data |
| stSlotMap | | | | slot map |
| stLineCard | | | | line cards |
| stMFDSPCard | | | | MFDSP cards |
| stCPUCard | | | | CPU cards |
| stSS7Card | | | | SS7 cards |
| stISDNCard | | | | ISDN cards |
| stEXNETCard | | | | EXNET cards |
| stOtherCard | | | | other types of card |
| chEntryUsed | | | | entry used flag |

TABLE 42

**Switch Library
Span Map Table**

| Field | | | | Comments |
|---|---|---|---|---|
| usLogSpanID | Span ID 1 | Span ID 2 | ... Span ID 3 | logical span ID |
| chEntryUsed | | | | entry used flag |

TABLE 43

**Switch Library
Line Card Table**

| Field | Line Card 1 | Line Card 2 | ... Line Card n | Comments |
|---|---|---|---|---|
| stCardInfo | | | | generic card info |
| usMaxSpan | | | | # of spans (4, 8) |
| usMaxChannel | | | | # of channels on each span |
| stSpanMap | | | | physical to logical map |
| chEntryUsed | | | | entry used flag |

TABLE 44

**Switch Library
CPU Card Table**

| Field | Comments |
|---|---|
| stCardInfo | generic card info |
| chIPAddr | Internet protocol address |
| sConnectState | Connect state |
| 1 SocketID | Socket identifier |
| chEntryUsed | entry used flag |

TABLE 45

**Switch Library
DSP Table**

| Field | DSP1 | DSP2 | ... DSPn | Comments |
|---|---|---|---|---|
| eFuncType | | | | function type of the DSP |
| sStatus | | | | status of this DSP |
| usMaxResource | | | | max resources of this type |
| usCurrUsed | | | | current used resource |
| chEntryUsed | | | | entry used flag |

TABLE 46

**Switch Library
Simm Table**

| Field | | | | Comments |
|---|---|---|---|---|
| US Simm ID | Simm ID 1 | Simm ID 2 | ... Simm ID 3 | Single inline memory module (SIMM) identifier |
| eSimmType | | | | SIMM type |
| sStatus | | | | status of this SIMM |
| usNoDSP | | | | # of DSPs on this SIMM |
| stDSP | | | | DSP structure |
| chEntryUsed | | | | entry used flag |

TABLE 5

Expression of ret, GDNFR-α, GRR2, and GRR3 in embryonic day 18 rat

|  | ret | GDNFR-α | GRR2 | GRR3 |
|---|---|---|---|---|
| Kidney/Intestine | +++ | +++ | ++ | −* |
| Brain: |  |  |  |  |
| Thalamic Nuclei: |  |  |  |  |
| Reticular | ++ | +++ | ++ | − |
| Ventral medial | + | +++ | ++ | − |
| Substantia Nigra | +++ | +++ | +++ | − |
| Habenular nucleus | − | +++ | − | − |
| Hippocampus | +/− | ++ | − | − |
| Spinal cord: |  |  |  |  |
| Dorsal | + | ++ | ++ | − |
| Ventral | ++ | +++ | ++ | − |
| Trigeminal Ganglia | +++ | +++ | − | +++ |

*High levels of expression were detected in the adult kidney.

TABLE 48

Switch Library Stack Table

| Field | | | | Comments |
|---|---|---|---|---|
| usStack ID | Stack ID 1 | Stack ID2 | ... Stack ID3 | stack identifier |
| ulOPC | | | | OPC |
| SS7ModVarEnum eMTPVariant | | | | Message transfer part |
| SS7ModVarEnum eISUPVariant | | | | Integrated Service Digital Network (ISDN) User Part (ISUP) |
| SS7ModVarEnum eL3PVariant | | | | eL3P |
| chEntryUsed | | | | entry used flag |

TABLE 49

Switch Library Linkset Table

| Field | | | | Comments |
|---|---|---|---|---|
| usLinkset ID | Linkset ID 1 | Linkset ID 2 | ... Linkset ID n | Linkset identifier which should be one byte |
| ulAPC | | | | adjacent point code |
| usStackID | | | | stack identifier |
| chEntryUsed | | | | entry used flag |

TABLE 50

Switch Library Link Table

| Field | | | | Comments |
|---|---|---|---|---|
| us LinkID | Link ID 1 | Link ID 2 | ... Link ID n | Link identifier |
| usStackID | | | | Stack identifier |
| usLinksetID | | | | Linkset identifier |
| usSLC | | | | one byte (0x00-0x0F) Signaling Link Code |
| usDataRate | | | | one byte (0x00-64 Kbps, 0x01-56 Kbps) |
| usSpanID | | | | span ID (two bytes) |
| usChannelID | | | | channel (one byte) |
| chEntryUsed | | | | entry used flag |

TABLE 51

Switch Library Destination Table

| Field | | | | Comments |
|---|---|---|---|---|
| usDestID | Dest ID 1 | Dest ID 2 | ... Dest ID 3 | destination identifier |
| ulDPC | | | | destination point code |
| chEntryUsed | | | | entry used flag |

TABLE 52

Switch Library Route Table

| Field | | | | Comments |
|---|---|---|---|---|
| US Route ID | Route ID 1 | Route ID 2 | ... Route ID n | Route identifier |
| usStackID | | | | Stack identifier which is one byte |
| ulDPC | | | | one byte destination point code |
| usLinksetID | | | | Linkset identifier |
| usDestID | | | | destination identifier |
| sPriority | | | | priority of the route (byte) |
| chEntryUsed | | | | entry used flag |

TABLE 53

Switch Library SS7 Card Table

| Field | SS7 Card 1 | SS7 Card 2 | ... SS7 Card n | Comments |
|---|---|---|---|---|
| stCardInfo | | | | generic card info |
| stStack | | | | stack type |
| stLinkset | | | | linkset type |
| stLink | | | | link type |
| stDest | | | | destination type |
| stRoute | | | | route type |
| chEntryUsed | | | | entry used flag |

TABLE 54

Switch Library EXNET Card Table

| Field | EXNET Card 2 | EXNET Card 2 | ... EXNET Card n | Comments |
|---|---|---|---|---|
| stCard Info | | | | Generic card information |
| usRing ID | | | | Logic ring identifier |
| chEntry Used | | | | entry used flag |

TABLE 55

Switch Library
Facility Table

| Field | | | | Comments |
|---|---|---|---|---|
| usFacSpan ID | Facility Span ID 1 | Facility Span ID 2 ... | Facility Span ID n | facility span identifier |
| chEntryUsed | | | | entry used flag |

TABLE 56

Switch Library
Channel Table

| Field | | | | Comments |
|---|---|---|---|---|
| usSpanID | | | | span identifier |
| usChannelID | Channel ID 1 | Channel ID 2 ... | Channel ID n | channel identifier |
| sFeature | | | | FAS or NFAS |
| sRole | | | | primary, or secondary, independent |
| usRelatedChannel | | | | related channel |
| chEntryUsed | | | | entry used flag |

TABLE 57

Switch Library
ISDN Card Table

| Field | ISDN Card 1 | ISDN Card 2 ... | ISDN Card n | Comments |
|---|---|---|---|---|
| stCardInfo | | | | generic card info |
| usNoDChannel | | | | number of D channels |
| stDChannel | | | | D channel type |
| chEntryUsed | | | | entry used flag |

TABLE 58

Switch Library
Other Card Table

| Field | Comments |
|---|---|
| stCardInfo | generic card info |
| chEntryUsed | entry used flag |

TABLE 59

Switch Library
Card Union Table

| Field | Comments |
|---|---|
| stCPUCard | CPU card |
| stLineCard | Line Card |
| stMFDSPCard | MFDSP Card |
| stSS7Card | SS7 Card |
| stISDNCard | ISDN Card |
| stOtherCard | Other Card |
| stEXNETCard | EXNET Card |

What is claimed is:

1. A computer in a telecommunications network, comprising:

a processor; and a resource management means for enabling said processor to provide standardized management of multiple resources including internal operational resources, external components, and applications processing data, wherein said resource management means comprises one or more resource managers, said resource managers being one of:
a semaphore resource manager;
a switch controller resource manager;
an agent resource manager;
a call data block resource manager;
a service logic resource manager; or
a switch resource resource manager;

wherein each of said resource managers comprises:

one or more resource manager application program interfaces that manage said internal operational resources, said external components, and said applications processing data; and one or more data storing means for enabling said processor to store data in table format related to said internal operational resources, said external components, and said applications processing data, said application interfaces manipulating the data to reflect the current resource state.

2. The computer of claim 1, wherein said data within said data storing means comprises one of:

switch controller data;

call data block data; or service logic program data.

3. The computer of claim 1, wherein said resource management means further comprises:

a table manager resource manager;

a queue logic manager resource manager;

a system manager resource manager; and a shared memory manager resource manager.

4. The computer of claim 2, wherein said data comprises one or more of:

switch controller IPC data;

switch controller CPU availability data;

switch controller disk availability data;

agent operational measurement count data, wherein said agent operational measurement count data is data collected for one or more agents controlled by a switch controller;

a switch port operational measurement count data, wherein said switch port operational measurement count data collected for one or more switches controlled by said switch controller;

control table data for control tables within said switch controller; or heartbeat data for heartbeating of routines within said switch controller.

5. The computer of claim 2, wherein said data stored in said table format comprises:

call identifying information;

calling number;

called number;

call leg information; and billing time point information.

6. A computer in a telecommunications network, comprising:

a processor; and plurality of application program interface means for enabling said processor which is connected to a memory, to provide an interface between one or more resource requesters and data organized in a plurality of tables, each of said plurality of tables corresponding to one of a plurality of resources, each of said plurality of application program interface means comprising:

sending means for sending a query; and managing means for managing data stored in said memory and organized in table format using said query;

wherein said application program interface means provides system-wide interface with said data;

wherein each of said plurality of application program interface means complies with a common standard for application programmer interfaces;

wherein each of said plurality of application program interface means manipulating the data to reflect the current resource state.

7. The computer of claim 6, wherein said data comprises one or more of:

semaphore data;

switch controller data;

agent data;

call data block data;

service logic program data; or switch data.

8. The computer of claim 6, wherein one of said application programmer interface means is one of:

create table semaphore;

initialize table semaphore;

create semaphore;

initialize semaphore;

delete semaphore;

attach semaphore;

lock semaphore table;

unlock semaphore table;

lock semaphore table entry;

unlock semaphore table entry;

lock semaphore one entry;

unlock semaphore one entry;

recover table semaphore;

get semaphore size;

get table semaphore value; or print semaphore.

9. The computer of claim 6, wherein one of said application programmer interface means is one of:

create switch controller common library memory segment;

delete switch controller common library memory segment;

attach switch controller common library memory segment; and detach switch controller common library memory segment.

10. The computer of claim 6, wherein one of said application programmer interface means is one of:

set up an operational measurements IPC;

update an operational measurements IPC;

print an operational measurements IPC;

get an operational measurements attribute; or set an operational measurements attribute.

11. The computer of claim 6, wherein one of said application programmer interface means is one of:

get time;

create a heartbeat table;

delete a heartbeat table;

attach to a heartbeat table;

detach from a heartbeat table;

create a heartbeat entry;

delete a heartbeat entry;

get a heartbeat handle;

request heartbeat;

respond heartbeat;

set heartbeat interval;

get heartbeat attributes; or print heartbeat table.

12. The computer of claim 6, wherein one of said application programmer interface means is one of:

create agent segment;

delete agent segment;

attach agent segment; or detach agent segment.

13. The computer of claim 6, wherein one of said application programmer interface means is one of:

create agent entry;

delete agent entry;

update agent state;

agent select;

agent destination number to terminal identifier conversion;

get agent data;

set agent data;

get agent attribute;

set agent attribute;

get agent handle;

get agent counts;

print agent table;

print agent entry; or print agent search table.

14. The computer of claim 6, wherein one of said application programmer interface means is one of:

create group entry;

delete group entry;

get group handle;

get group data;

set group data;

increase calls queued on group;

decrease calls queued on group;

get group count;

print group table;

print group entry; or print group search table.

15. The computer of claim 6, wherein one of said application programmer interface means is one of:

create assign entry;

delete assign entry by keys;

delete agent assign;

delete group assign;
get assign by keys;
get assign count;
get agent assign count;
get group assign count; or
print assign table.

16. The computer of claim 6, wherein one of said application programmer interface means is one of:
create call data block table;
delete call data block table;
attach call data block table;
detach call data block table;
create call data block entry;
delete call data block entry;
call data block search call identifier by port identifiers;
get call data block data;
set call data block data;
print call data block data;
return call data block attribute;
set call data block attribute;
get number call data block entries;
print call data block table; or
print call data block entry.

17. The computer of claim 6, wherein one of said application programmer interface means is one of:
create service logic program table;
delete service logic program table;
attach service logic program table;
detach service logic program table;
create service logic program entry;
delete service logic program entry;
get service logic program data;
set service logic program data;
print service logic program data;
get service logic program attribute;
set service logic program attribute;
service logic program search call identifier by terminal identifier;
get service logic program count;
print service logic program table; or
print service logic program entry.

* * * * *